A. SCHNEIDER.
MACHINE FOR BOTTLING LIQUIDS.
APPLICATION FILED APR. 7, 1909.
976,751.
Patented Nov. 22, 1910.
12 SHEETS—SHEET 1.
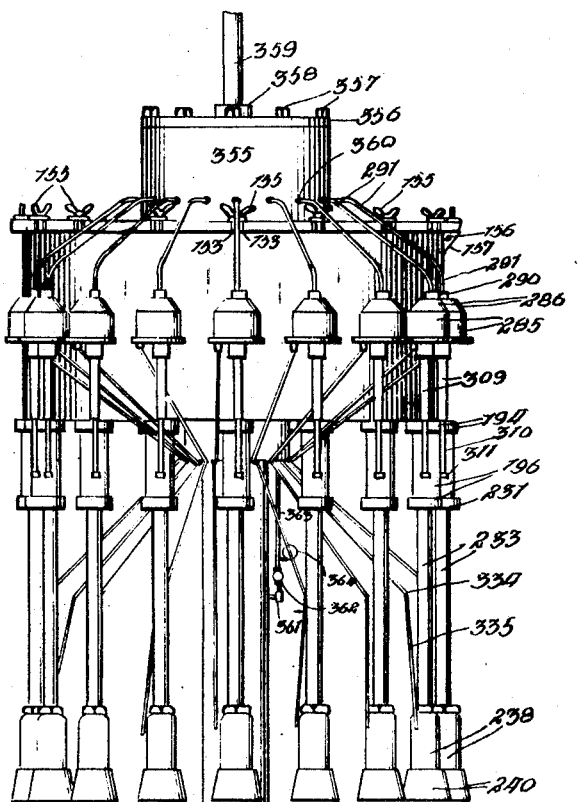
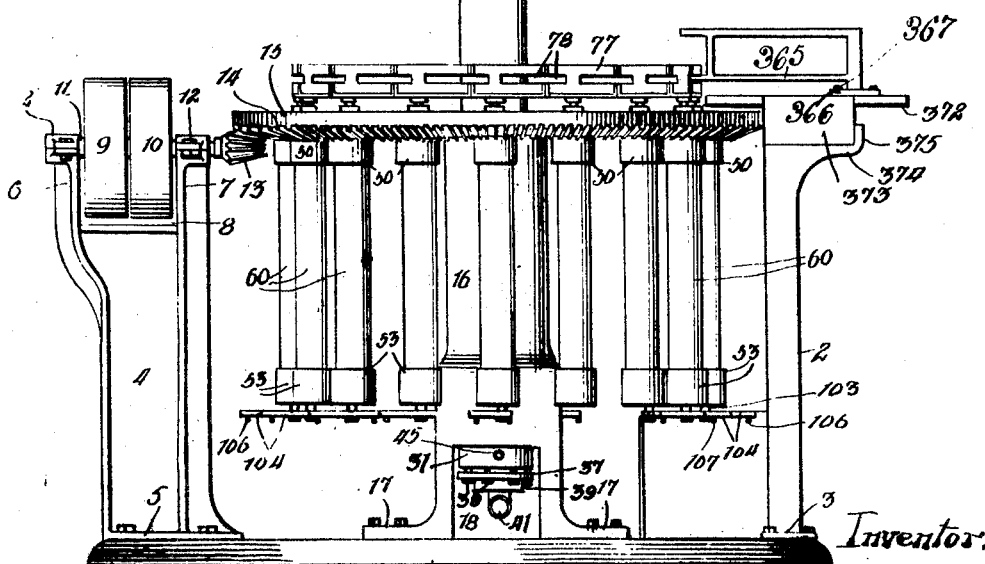

A. SCHNEIDER.
MACHINE FOR BOTTLING LIQUIDS.
APPLICATION FILED APR. 7, 1908.
976,751.
Patented Nov. 22, 1910.
12 SHEETS—SHEET 2.
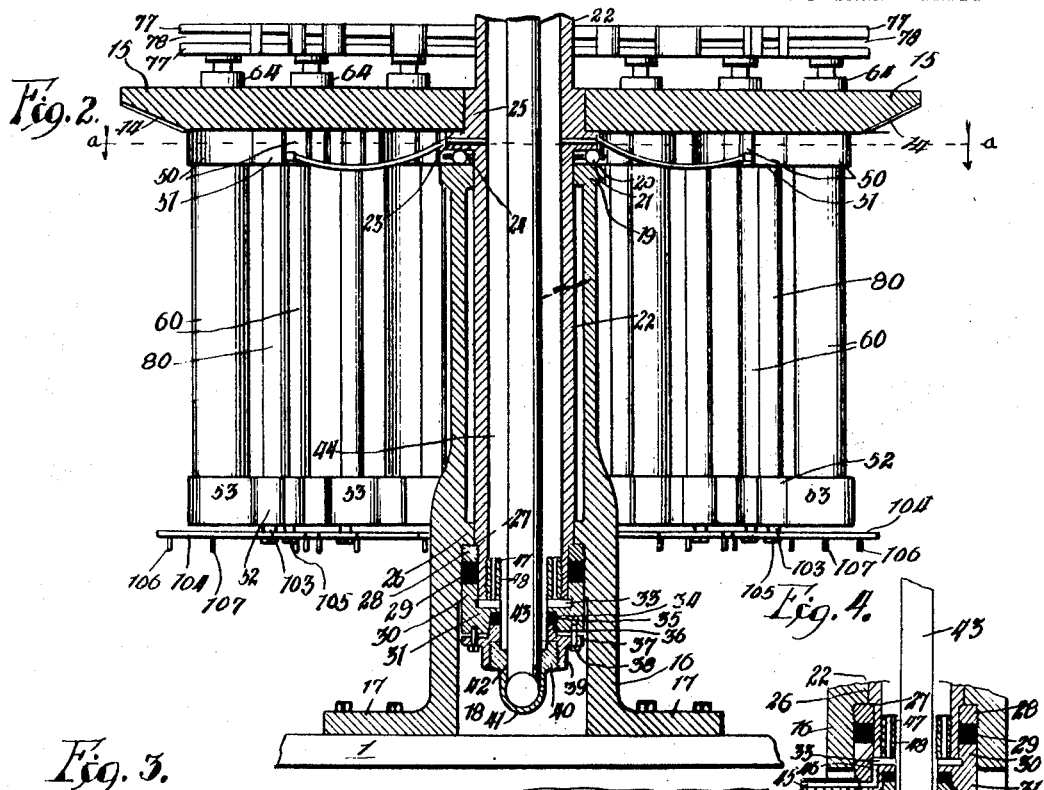
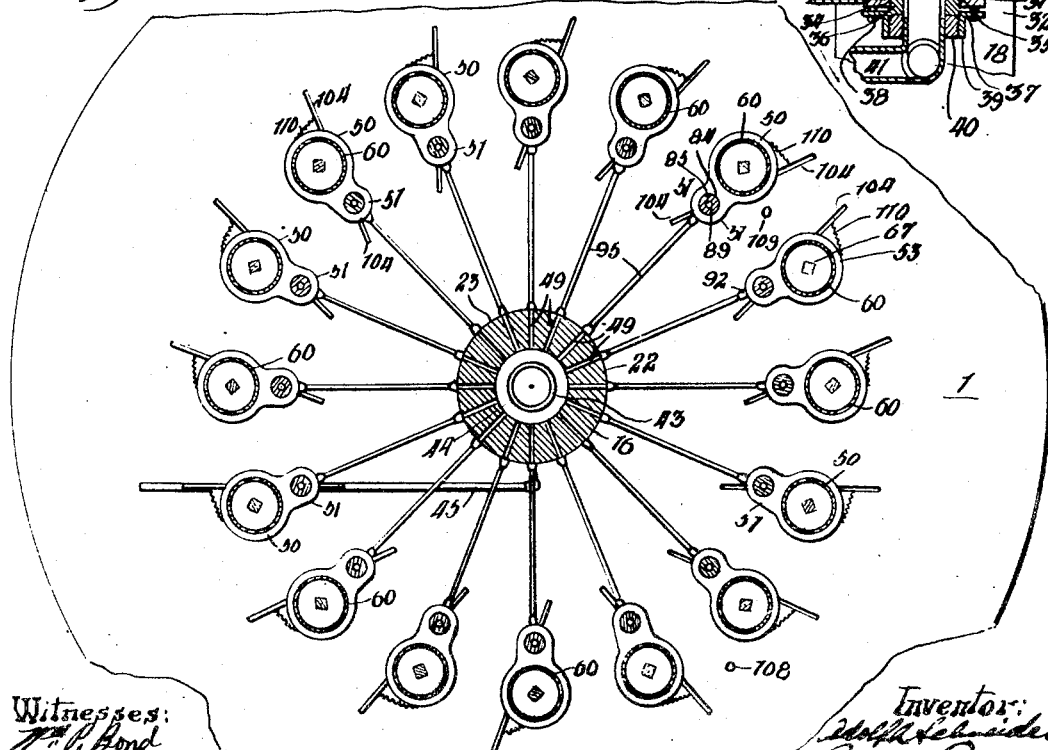

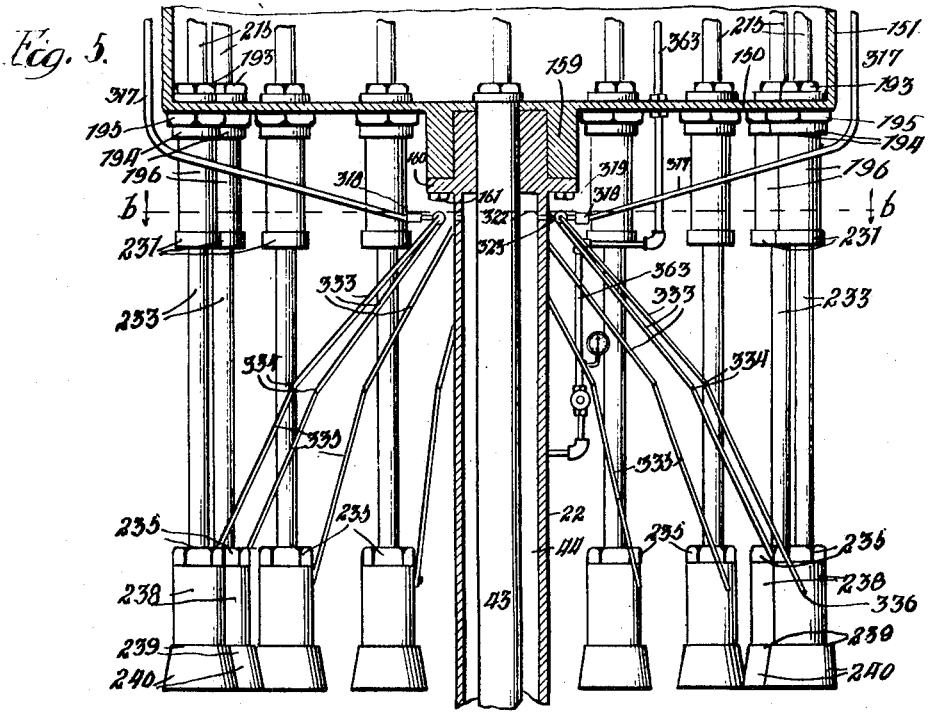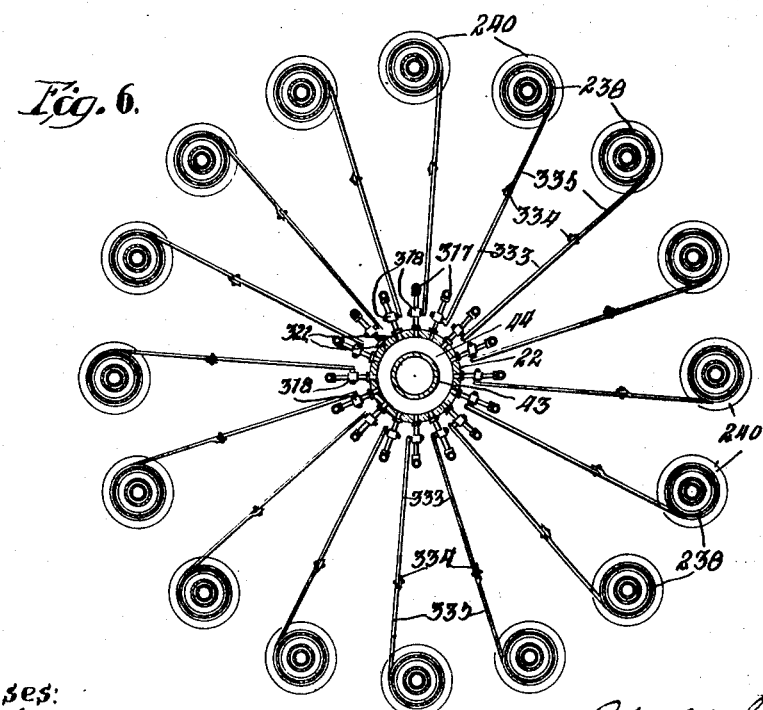

A. SCHNEIDER.
MACHINE FOR BOTTLING LIQUIDS.
APPLICATION FILED APR. 7, 1908.
976,751.
Patented Nov. 22, 1910.
12 SHEETS—SHEET 4.
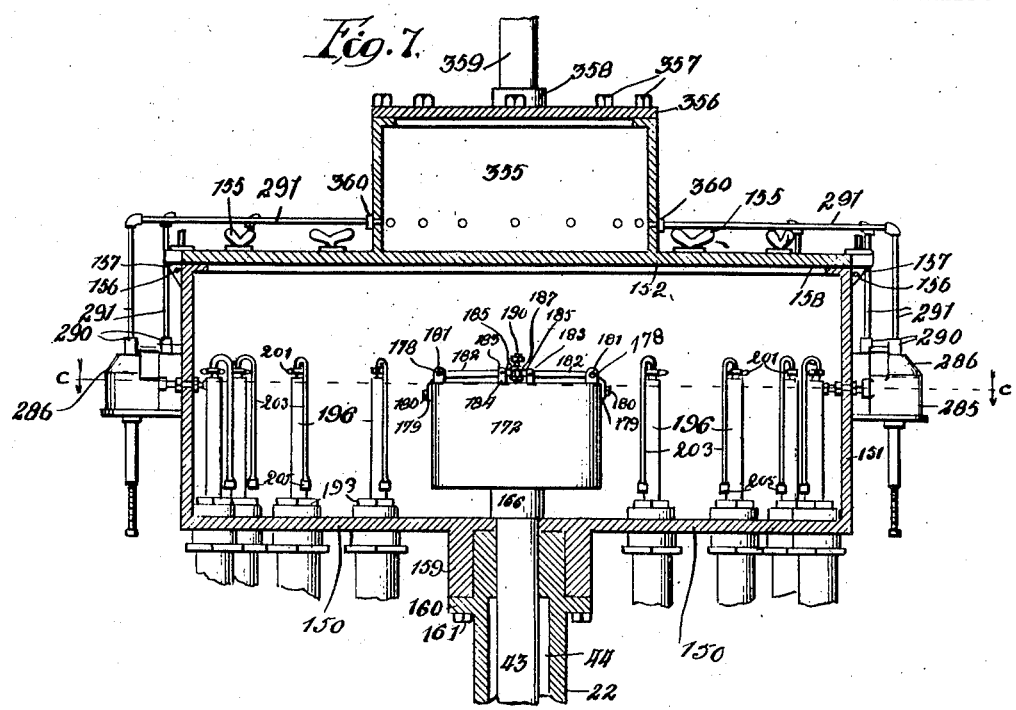
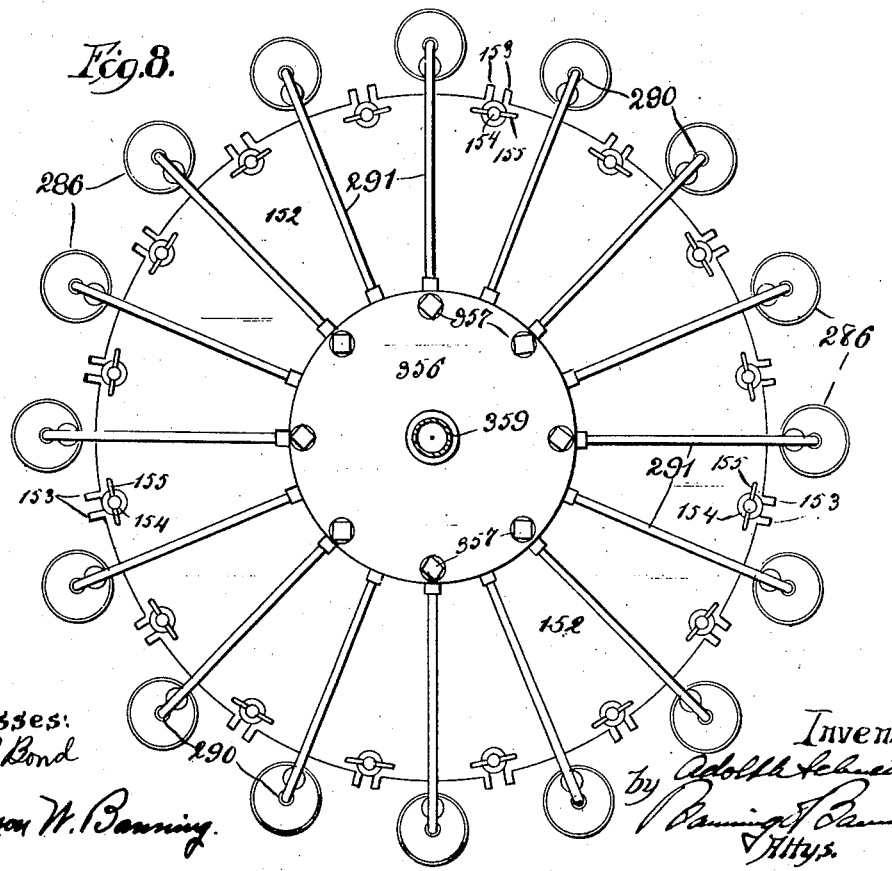

A. SCHNEIDER.
MACHINE FOR BOTTLING LIQUIDS.
APPLICATION FILED APR. 7, 1908.
976,751.
Patented Nov. 22, 1910.
12 SHEETS—SHEET 5.
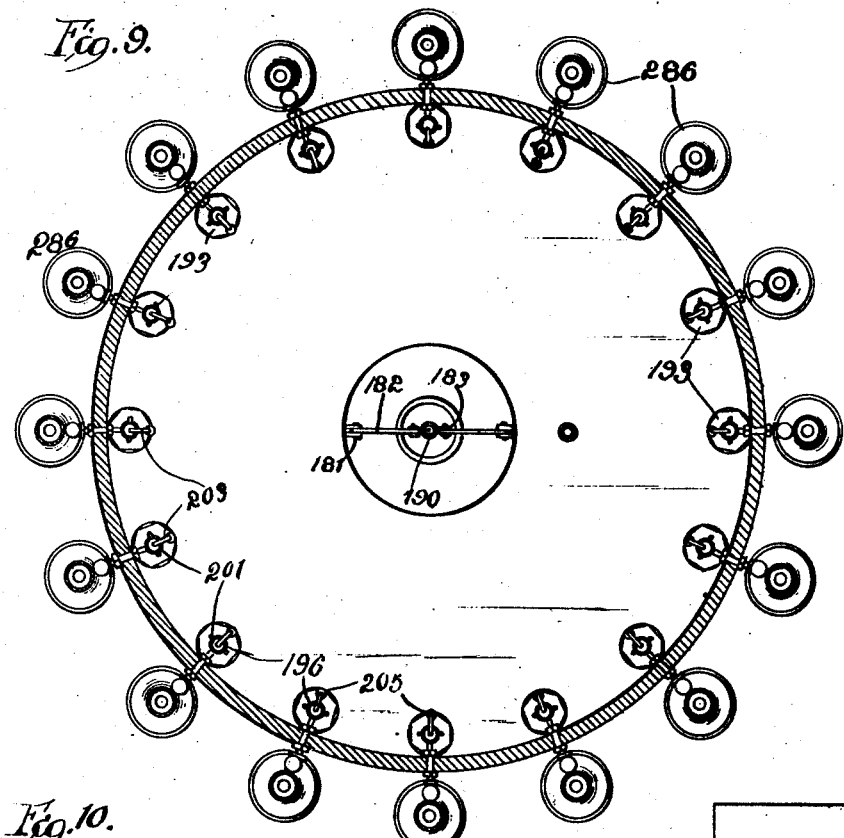
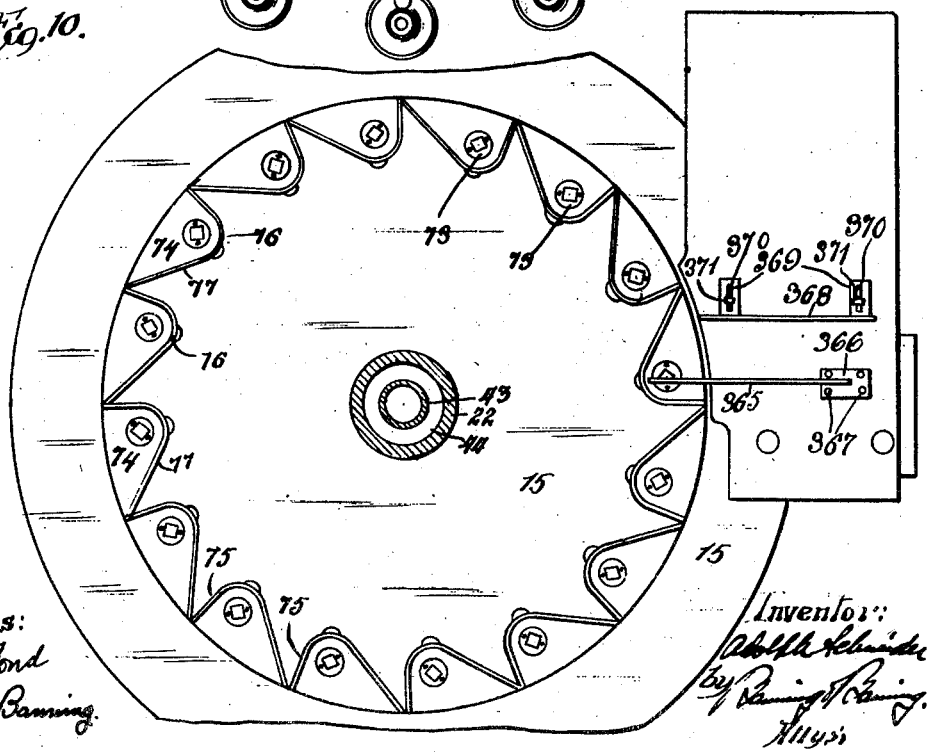

A. SCHNEIDER.
MACHINE FOR BOTTLING LIQUIDS.
APPLICATION FILED APR. 7, 1908.
976,751.
Patented Nov. 22, 1910.
12 SHEETS—SHEET 6.
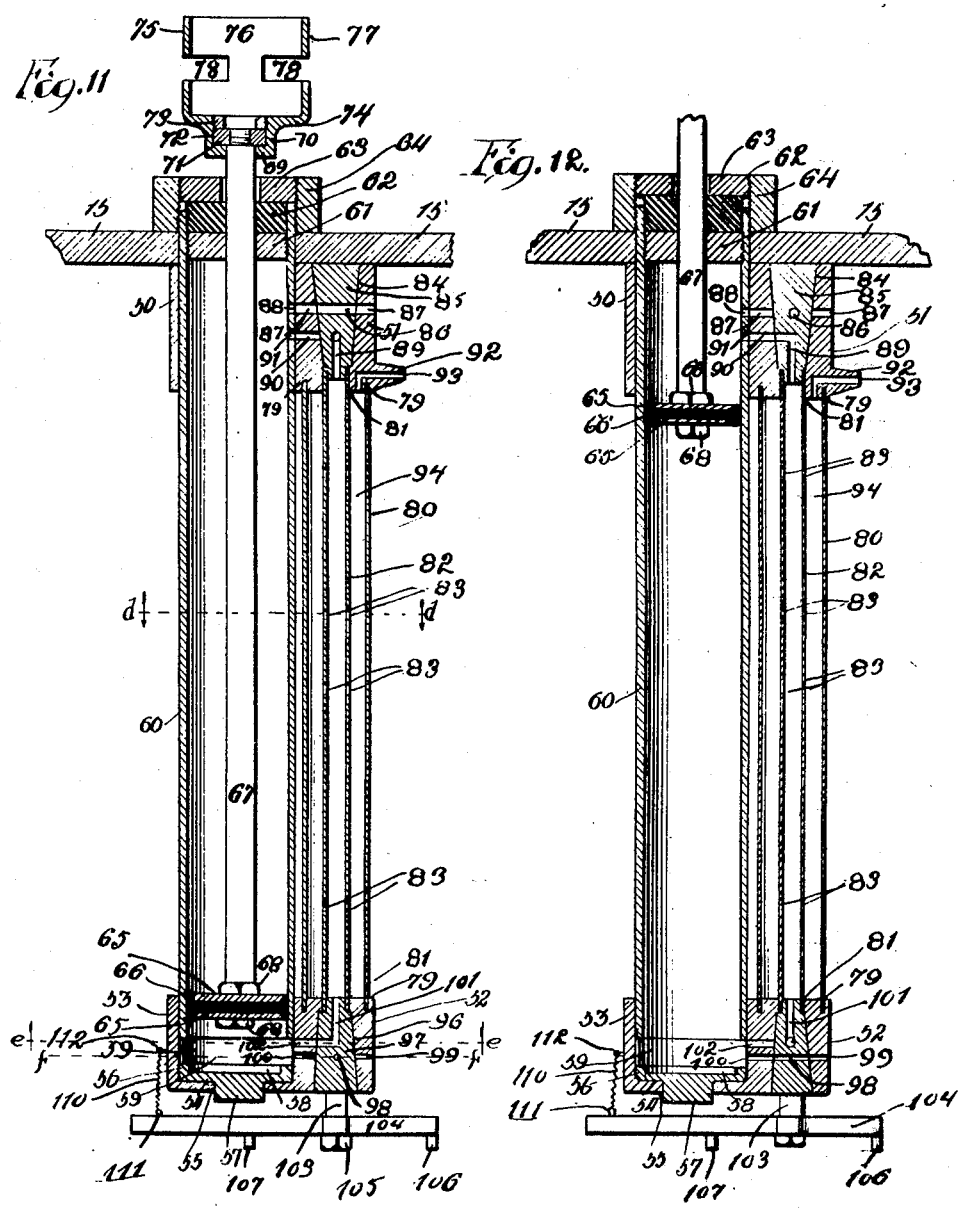
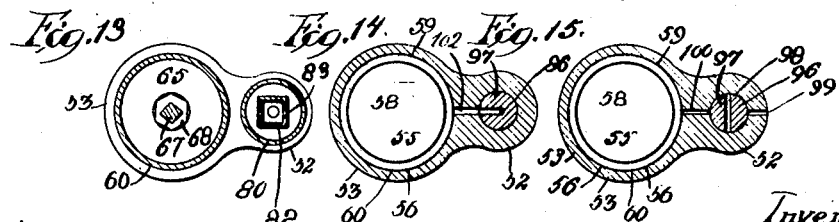

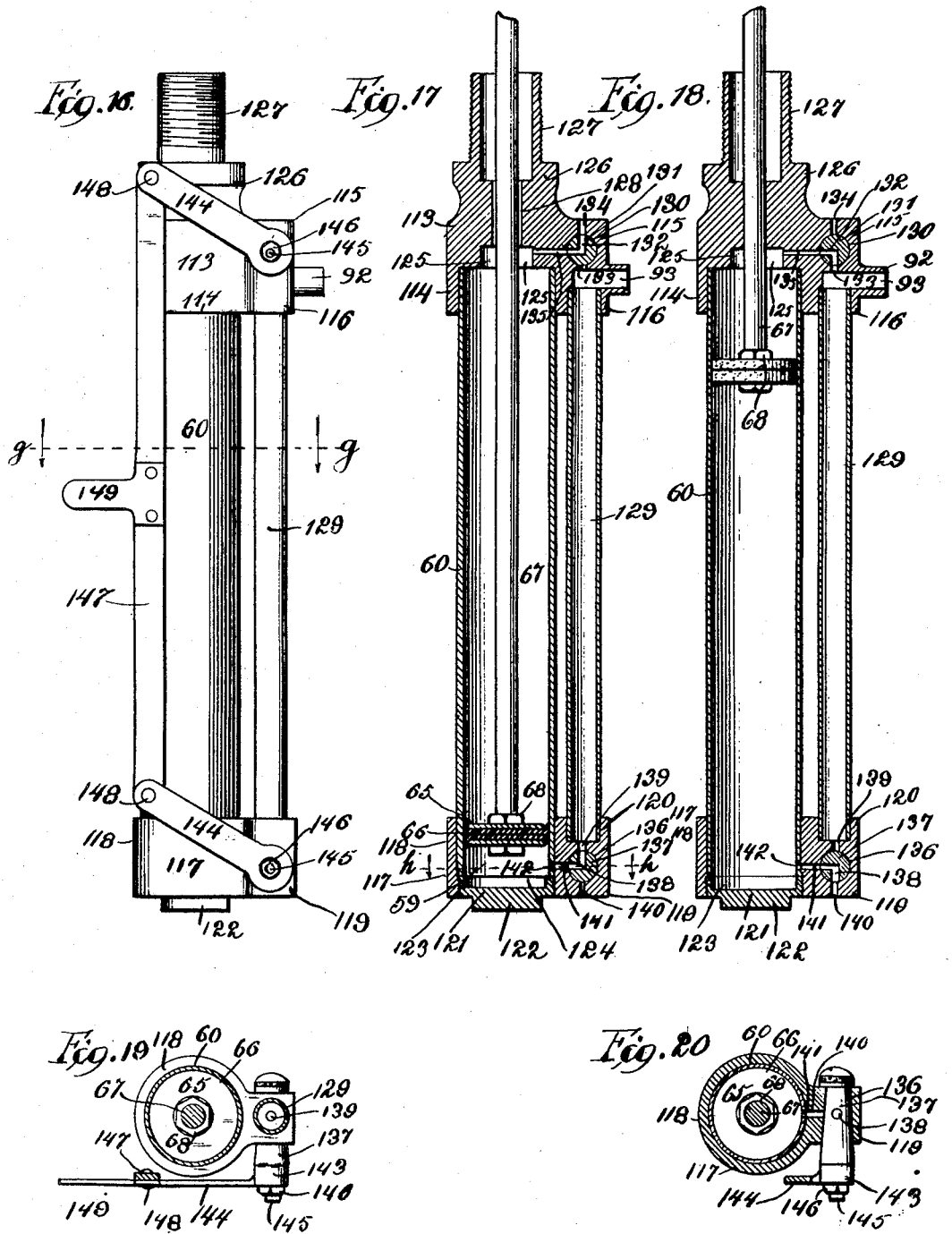

A. SCHNEIDER.
MACHINE FOR BOTTLING LIQUIDS.
APPLICATION FILED APR. 7, 1908.
976,751.
Patented Nov. 22, 1910.
12 SHEETS—SHEET 8.
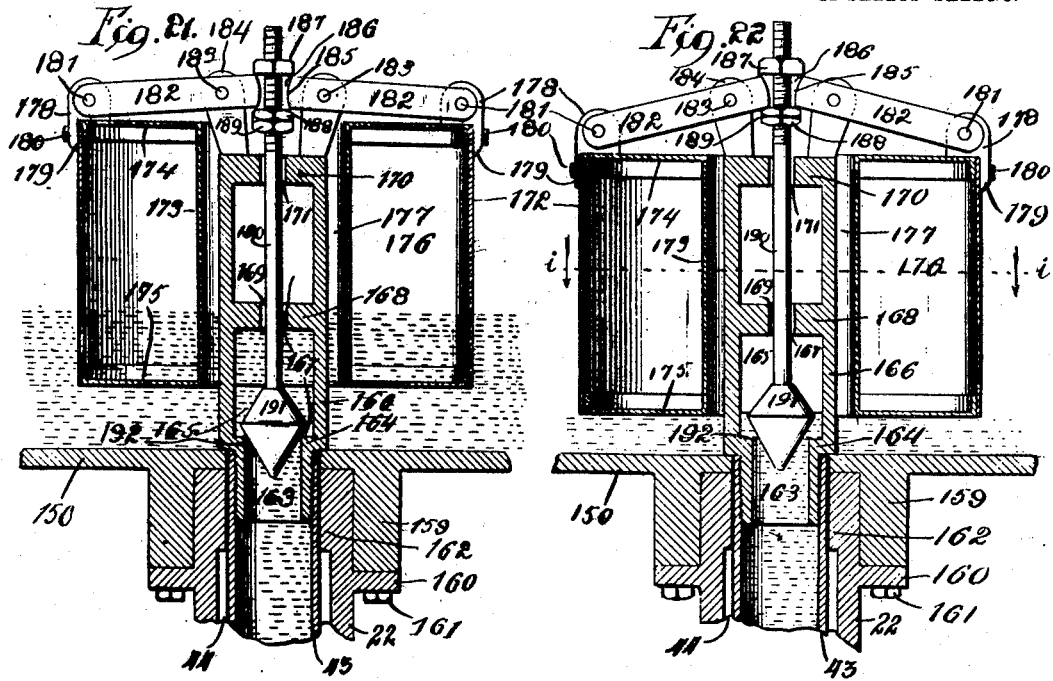
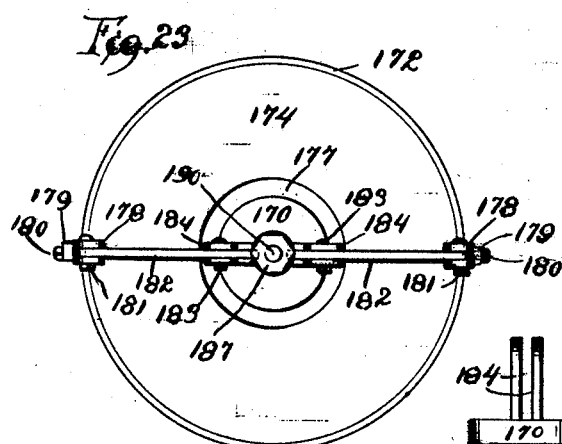
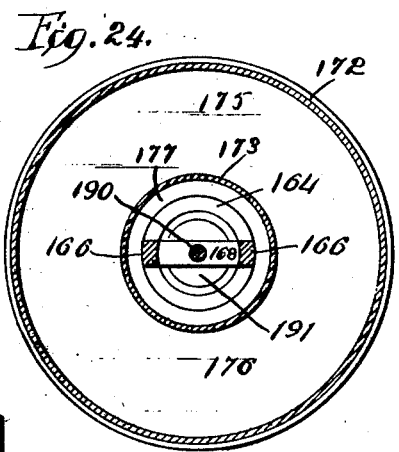
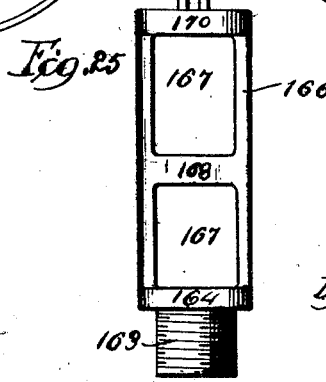
Witnesses:
Wm P. Bond
Pierson W. Banning
Inventor:
Adolph Schneider
by Banning & Banning
Attys.

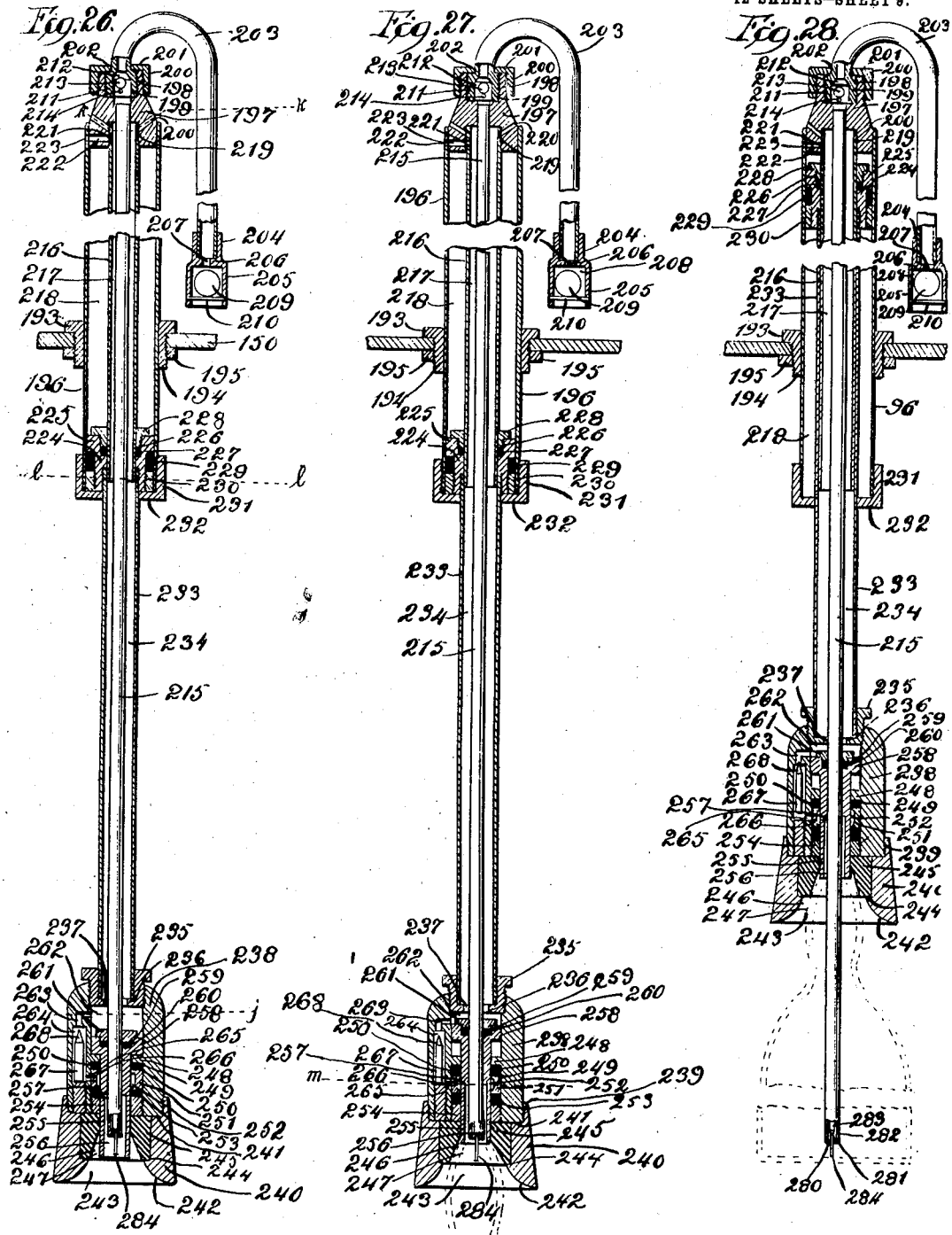

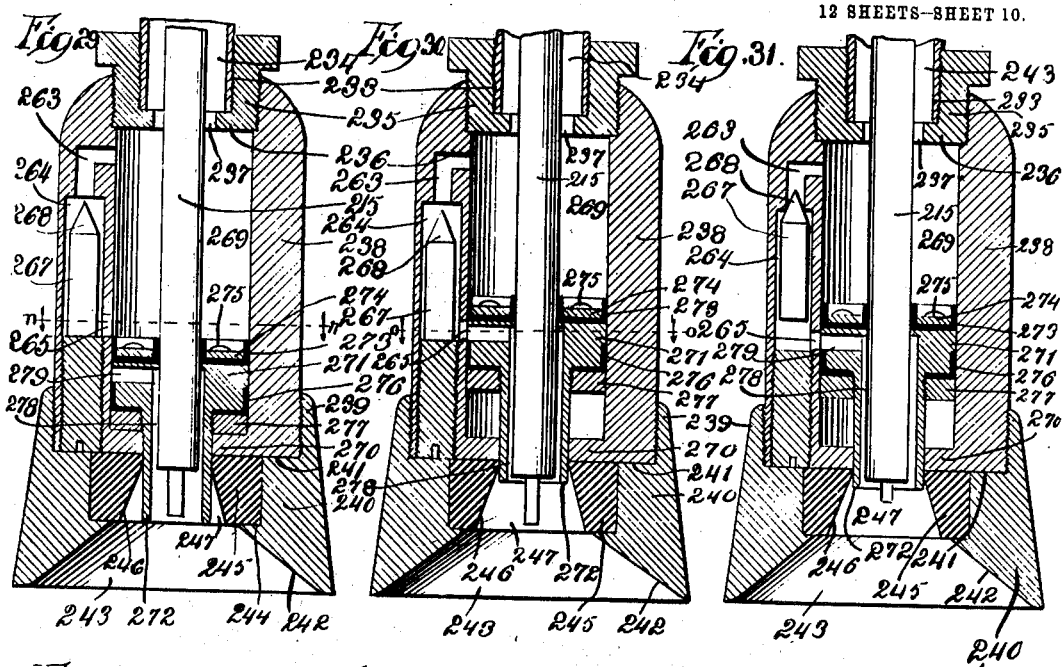

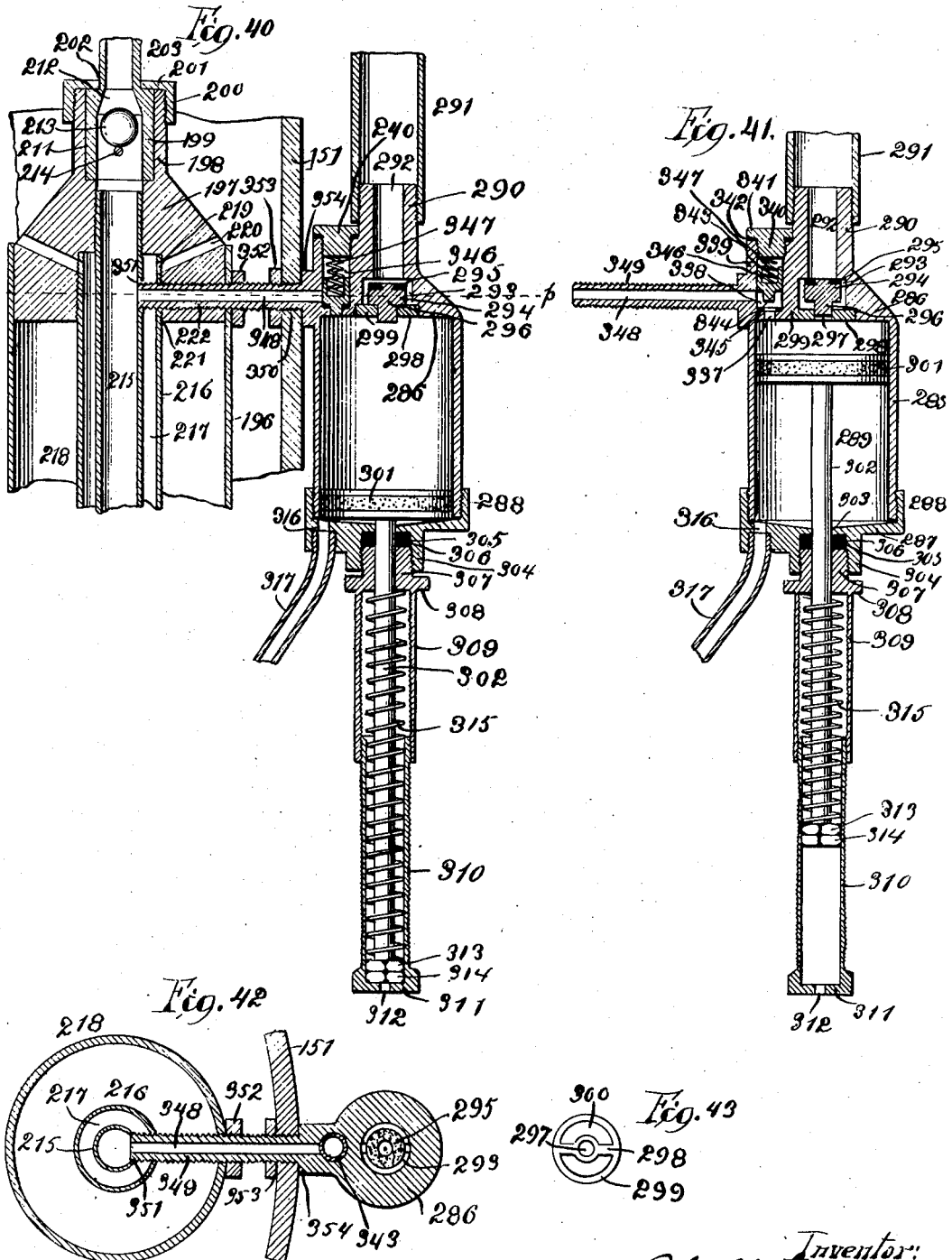

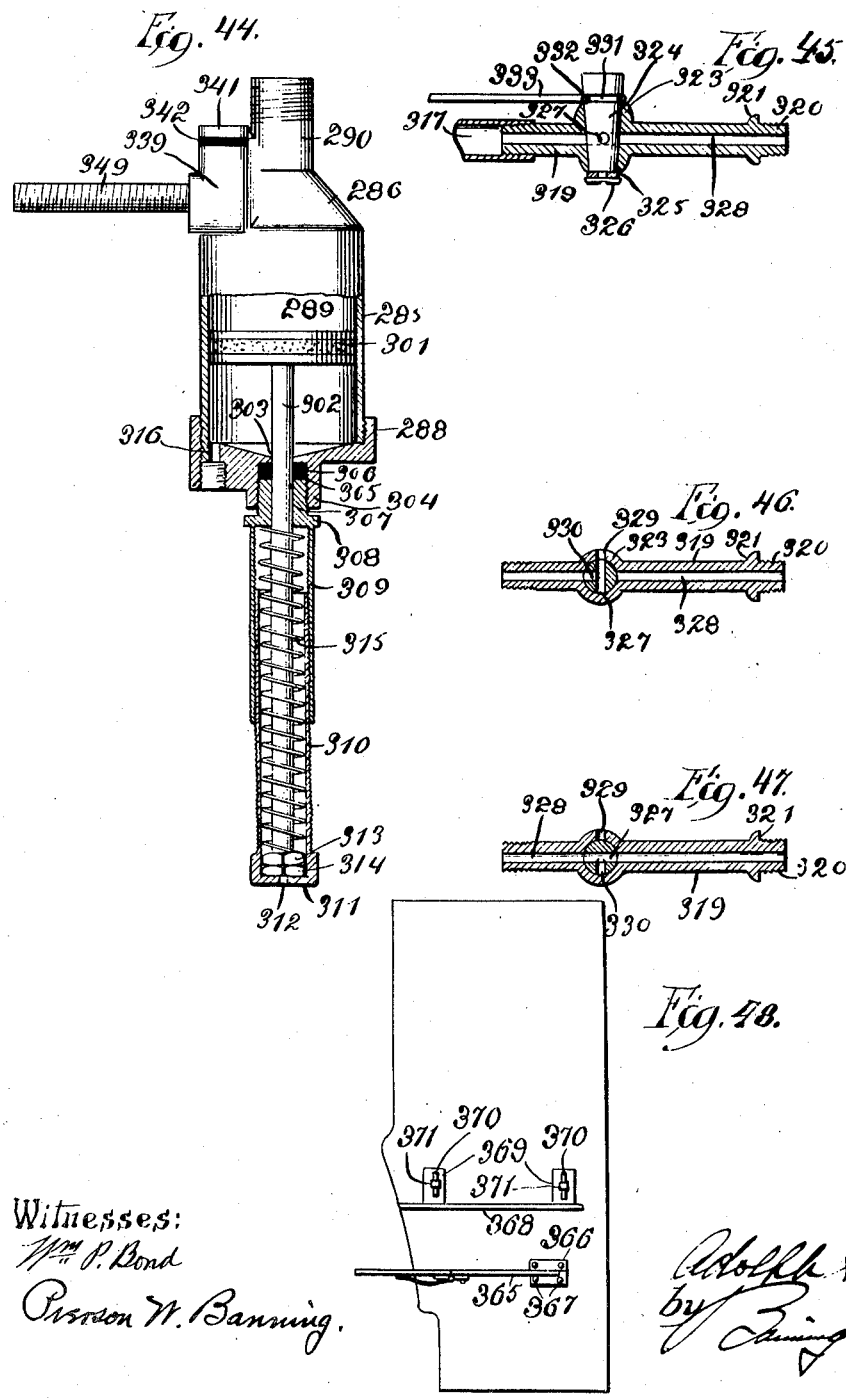

UNITED STATES PATENT OFFICE.

ADOLPH SCHNEIDER, OF CHICAGO, ILLINOIS.

MACHINE FOR BOTTLING LIQUIDS.

976,751.  Specification of Letters Patent.  Patented Nov. 22, 1910.

Application filed April 7, 1908. Serial No. 425,657.

*To all whom it may concern:*

Be it known that I, ADOLPH SCHNEIDER, a citizen of the United States, residing at Chicago, in the county of Cook and State of Illinois, have invented certain new and useful Improvements in Machines for Bottling Liquids, of which the following is a specification.

This invention relates to rotary bottle filling machines, or machines having a tank for containing liquid rotatably mounted, and having connected therewith a plurality of filling tubes, the machine also having a rotatable table or carrier on which is mounted a plurality of bottle supports, one support for each filling tube, and each support operative to raise the bottle into position for entering the filling tube thereinto in filling the bottle with liquid. The bottles will be successively filled as the tank and the table or carrier revolve, and after being filled each bottle is removed from the table or carrier and replaced by another bottle to be filled.

The features of construction entering into the machine, while more particularly intended and adapted for use with a revoluble tank and a revoluble table or bottle support, as to some of said features, the same are adapted for use and can be used with other types or forms of bottle filling machines, particular reference being had to the operation of the filling tubes, the control of the liquid supply, and the operation of the table or carrier for the bottles.

The objects of the invention are to improve the means for rotating the table carrying the bottles and the filling tank carrying the filling tubes; to improve the means for positively and automatically raising and lowering in succession the supports for the bottle carried by the rotatable table, and have each bottle support independently actuated through the medium of a motor cylinder and a controlling valve for each cylinder; to improve the construction and operation of the motor cylinder and the controlling valve therefor, by which each bottle support is independently raised and lowered; to supply the requisite pressure to each motor cylinder for operating the piston in the cylinder, and have the supply for each cylinder independent, so that the valve, controlling the supply for each cylinder, will be operated as the rotatable table is carried around, to reverse the admission of the pressure below and above the piston in raising and lowering the support for the bottle; to improve the means for supplying pressure to the motor cylinder in operating the piston of the cylinder to raise and lower the bottle support; to provide means for automatically operating the valves controlling the admission of pressure to each motor cylinder, and have such means actuated as the rotatable table is carried around; to construct a bottle support and means coöperating therewith, to remove the bottle from the support with the rotation of the table or carrier; to positively and automatically control the flow of liquid into the filling tank as required for use; to automatically and positively operate a shut-off valve for the liquid supply, said valve being operated by the rise and fall of a float within the filling tank; to improve the construction and operation of the float and the parts carried thereby, for automatically opening and closing the tube supplying liquid to the filling tank; to improve the construction, arrangement and operation of the filling tank and the filling tubes; to positively and automatically control the flow of liquid from the filling tank into each bottle; to improve the construction and operation of the sealing head and the filling tube and the connection for these parts with the filling tank; to enable a flavoring syrup to be supplied to the liquid in the bottle as may be required; to positively and automatically control the flow of the syrup from the receptacle therefor into the bottle; to open communication between the syrup receptacle and the filling tube for the liquid and to close communication between the syrup receptacle and the filling tube for the liquid by and through the movement of the sealing head for the bottle; and to improve generally the construction and operation of the several mechanisms and elements entering into the formation of the machine as a whole.

The invention consists in the features of construction and combinations of parts hereinafter described and claimed.

In the drawings illustrating the invention Figure 1 is a side elevation of the machine complete; Fig. 2 a sectional elevation of the main pedestal or standard, the rotatable table or carrier, the motors and bottle supports and the liquid supply tube; Fig. 3 a cross section on line *a—a* of Fig. 2, looking in the direction of the arrow; Fig. 4 a detail in section, showing the stuffing box connection at the lower end of the hollow driving shaft and the liquid supply tube; Fig. 5 a sectional elevation, showing the upper end of the hollow tubular shaft, the liquid supply tube, a portion of the filling tank, and the filling tubes and sealing heads; Fig. 6 a cross section on line b—b of Fig. 5, looking in the direction of the arrow; Fig. 7 a sectional elevation of the filling tank, showing the reservoir for the syrup; Fig. 8 a top or plan view of the filling tank, showing the syrup reservoir and the syrup receptacle for each filling tube for the liquid; Fig. 9 a cross section on line c—c of Fig. 7, looking in the direction of the arrow; Fig. 10 a top or plan view of the rotatable table or carrier with the bottle supports; Fig. 11 a sectional elevation of one of the motor cylinders and the controlling valves, for admitting pressure to opposite ends of the cylinder; Fig. 12 a similar view to Fig. 11, showing the lower valve closed and the upper valve open, Fig. 11 showing the lower valve open and the upper valve closed; Fig. 13 a cross section on line d—d of Fig. 11, looking in the direction of the arrow; Fig. 14 a cross section on line e—e of Fig. 11, looking in the direction of the arrow; Fig. 15 a cross section on line f—f of Fig. 11, looking in the direction of the arrow; Fig. 16 a side elevation, showing a modification of the means for opening and closing the valves supplying pressure to the motor cylinder; Fig. 17 a sectional elevation of the construction of motor cylinder shown in Fig. 16, with the lower valve open to induct pressure and the upper valve open to educt pressure; Fig. 18 a similar view to Fig. 17, with the lower valve open to educt pressure and the upper valve open to induct pressure; Fig. 19 a cross section on line g—g of Fig. 16, looking in the direction of the arrow; Fig. 20 a cross section on line h—h of Fig. 17, looking in the direction of the arrow; Fig. 21 a sectional elevation, showing the valve for controlling the admission of liquid to the filling tank and the float for operating the valve, with the valve in its closed position; Fig. 22 a similar view to Fig. 21, with the valve in its open position; Fig. 23 a top or plan view of the float and the operating arms or levers for the valve carried thereby; Fig. 24 a cross section on line i—i of Fig. 22, looking in the direction of the arrow; Fig. 25 an elevation of the cage or support for the valve of the liquid supply tube; Fig. 26 a sectional elevation of a filling tube with its sealing head, showing the sealing head in its lowermost or normal position; Fig. 27 a similar view to Fig. 26, showing the sealing head in its normal position, with the end of a bottle entered thereinto for raising the piston valve, admitting pressure to the to-be filled bottle; Fig. 28 a similar view to Fig. 26, showing the sealing head fully raised and the filling tube open, for discharging liquid into the to-be filled bottle; Fig. 29 a sectional elevation, showing a modified construction of the sealing head, with the piston valve for controlling the admission of pressure in its normal position; Fig. 30 a similar view to Fig. 29, with the piston valve raised for admission of pressure to the to-be filled bottle; Fig. 31 a similar view to Fig. 30, with the float valve raised to close the passage for admitting pressure against the flow of liquid therethrough; Fig. 32 a cross section on line j—j of Fig. 26, looking in the direction of the arrow; Fig. 33 a cross section on line k—k of Fig. 26, looking in the direction of the arrow; Fig. 34 a cross section on line l—l of Fig. 26, looking in the direction of the arrow; Fig. 35 a cross section on line m—m of Fig. 27, looking in the direction of the arrow; Fig. 36 a cross section on line n—n of Fig. 29, looking in the direction of the arrow; Fig. 37 a cross section on line o—o of Fig. 30, looking in the direction of the arrow; Fig. 38 a detail, partly in section, of the lower end of the filling tube for the liquid, showing the valve closed; Fig. 39 a similar view to Fig. 38, showing the valve open; Fig. 40 a detail, in sectional elevation, showing the upper end of the filling tube for the liquid and the syrup receptacle; Fig. 41, a sectional elevation of the syrup receptacle, showing the parts in position for discharging syrup, Fig. 40 showing the parts in closed position; Fig. 42 a cross section on line p—p of Fig. 40, looking in the direction of the arrow; Fig. 43 a plan view of the skeleton support or guide for the inlet into the syrup receptacle; Fig. 44 an elevation, partly in section, of the syrup receptacle; Fig. 45 a detail in section, showing the conduit or nozzle with the controlling valve therefor, for admitting air, or other medium, under pressure, to operate the piston of the syrup receptacle, and showing the controlling valve closed; Fig. 46 a longitudinal section of the conduit or nozzle for admitting air, or other medium under pressure, to the syrup receptacle, showing the controlling valve closed; Fig. 47 a similar view to Fig. 46, showing the controlling valve open; and Fig. 48 a detail, showing a modification in the pusher for removing the bottle from the bottle support.

The machine shown has the operating parts mounted on a bed or base plate 1, extending up from which, on one side, is a post or upright 2, having a flange 3 at its lower end, by means of which, and suitable bolts or otherwise, the post or upright is fixedly attached to the bed or base plate. A post or upright 4 is located opposite the post or upright 2 and has, at its lower end, a flange 5, by means of which, and suitable bolts or otherwise, the post or upright is fixedly attached to the bed or base plate. The post or upright 4, at its upper end, is divided so as to furnish a standard 6 and a standard 7, with an opening 8 between them, in which opening is located a loose pulley 9 and a fast pulley 10, both on a shaft 11 mounted in suitable journal boxes 12 on the upper ends of the standards 6 and 7, so that, by a driving belt, the shaft 11 can be driven in the usual way of driving a shaft through the medium of fast and loose pulleys and a driving belt. The inner end of the shaft 11 has fixedly attached thereto a beveled or miter pinion 13 which meshes with a driving gear 14 on the under side of a table or carrier 15, so that with the revolving of the shaft 11 the table or carrier 15 will be rotated.

A pedestal or standard 16 is fixedly attached, by flanges 17 at its lower end and suitable bolts or otherwise, to the bed or base plate 1, and this standard or pedestal, at the bottom, has an opening 18 in which is located the connection for the liquid and air supply for the operation of the machine. The upper end of the standard or pedestal 16 has a plate or flange 19, on the upper side of which is a ball race 20 receiving antifriction balls 21 on which the table or carrier 15 is supported and rotates. A tubular or hollow revolving shaft 22 is entered into the pedestal or standard 16; and this hollow or tubular shaft 22 has a circumferential flange 23 located above the upper end of the standard or pedestal, which flange, on its under side, has a ball race 24, for the balls 21, completing the ball bearing for the rotatable table or carrier. The hollow or tubular shaft 22, above the flange 23, has a square hub 25, entering a square opening in the rotatable table or carrier 15, so that the rotation of the table or carrier will revolve the hollow or tubular shaft 22, to the upper end of which the filling tank is fixedly attached, causing the table or carrier and the filling tank to revolve together.

The interior of the pedestal or standard 16 has an inwardly extending flange or ledge 26, and the lower end of the revoluble hollow or tubular shaft 22, is of less diameter than the main body of such shaft, so as to form a shoulder 27, which, when the parts are assembled, is in line with the under side of the flange or ledge 26, as shown in Fig. 2. The opening 18, in the base of the pedestal or standard 16, is continued upwardly, so as to form a circular or annular opening, and in this opening, beneath the flange or ledge 26, is screw threaded a ring 28, which bears against the shoulder 27 of the hollow or tubular shaft 22, and furnishes a bearing or support for the lower end of such shaft. A packing ring 29 is located in the opening of the pedestal or standard 16 below the bearing rings 28, and this packing ring is compressed around the lower end of the hollow or tubular shaft 22, so as to make a tight joint for the lower end of the shaft by means of a follower or gland 30 on a plate 31, which plate is attached to the wall of the pedestal or standard 16 by means of bolts 32, so that the plate 31 and the follower or gland 30 can be advanced, as required to compress the packing 29 for a tight joint around the lower end of the hollow or tubular shaft 22, without interfering with the revolving of such shaft. The opening within the gland or follower 30, below the lower end of the revolving hollow or tubular shaft 22, constitutes an air chamber 33; and the under side or face of the supporting plate 31 has formed therein a chamber 34, which receives a packing ring or packing 35; and the packing ring or packing 35 is compressed by a gland or follower 36 on a plate 37 adjustably connected with the plate 31 by bolts 38, so that the plate 37 and the gland 36 can be advanced to compress the packing ring or packing 35 and make a tight joint around the liquid supply tube. The plate 37, on its under side, has a depending rim or flange 39, with an interior screw thread, into which is entered a coupling plug 40 having a neck 41, and a hole or passage 42, into which is entered the lower end of a liquid supply tube 43, and the neck 41 has connected therewith a hose or other conduit, leading to a source of liquid supply, so that liquid can be supplied to the tube 43 and be discharged into the filling tank for the liquid. It will be understood that the liquid supply tube 43 is fixed and extends upward within the interior of the hollow or tubular revoluble shaft 22, with a passage or space 44 between the exterior of the supply tube 43 for liquid and the interior of the hollow or tubular revoluble shaft, as shown in Fig. 2.

A tube 45 has its inner end entered into a passage 45 therefor in the plate 31, and this tube 45 is connected with a source of medium under pressure, such as compressed air, for supplying the medium under pressure to operate the motor cylinders of the bottle supports, and to supply pressure to the liquid tank and to the bottles to be filled, for equalizing the pressure between the filling tank and the bottles, and to supply air to a syrup receptacle, for discharging syrup to enter the filling tube of the bottle and charge the liquid in the bottle with a flavoring syrup. The tube 45 is in communication with an L-shaped passage 46, the vertical member of which opens into the air chamber 33, and from the air chamber the medium under pressure flows through passages 47 in a ring 48, threaded into the lower end of the revoluble hollow or tubular shaft 22, for supplying pressure to the chamber or passage 44 between the liquid supply tube 43 and the hollow or tubular shaft 22, as shown in Figs. 2 and 4.

The rotatable table or carrier 15 supports a plurality of motor cylinders, and each motor cylinder operating bottle support. The construction, shown in Figs. 11 to 15, both inclusive, has secured to the under side of the rotatable table or carrier a plurality of heads, each head consisting of a wall 50 and a wall 51, the two walls formed integral with each other. The walls 50 and 51 constitute an upper head for each motor cylinder and its valve controlled tube for supplying pressure to operate the piston in the motor cylinder. Each motor cylinder and its valve controlled tube for pressure has, at the lower end, a head formed of a wall 52 and a wall 53 integral with each other. The lower end of the opening for the wall 53 is closed by a plug 54 formed of a bottom wall 55 and an annular rim or flange 56, with a neck or boss 57 for a wrench or other instrument, by means of which the plug is threaded into the lower end of the wall 53, to close the lower end of the wall opening; and the annular flange or rim furnishes a chamber 58 in communication with the chamber 59 of the wall 53 below the end of the motor cylinder. Each motor cylinder 60 is entered, at its lower end, into the wall 53 of the lower head; and, as shown in the construction of Figs. 11 to 15, both inclusive, the upper end of each motor cylinder extends through the wall 50 of the upper head and through the rotatable table or carrier 15, and the upper end of each motor cylinder 60 has an interior screw thread and has threaded thereinto a cross wall or disk 61, above which is a packing ring or packing 62, which is compressed between the cross wall or ring 61 and a cross wall or ring 63, which wall or ring 63 is threaded into an annular nut or wall 64 threaded onto the exterior of the cylinder 60 and abutting against the upper face of the table or carrier 15, so that each motor cylinder is supported and carried by the rotatable table or carrier 15, as shown in Figs. 11 and 12.

Each motor cylinder has located and operating therein a piston formed of an upper and lower plate 65 and cup leather packings 66, secured to the lower end of a piston rod 67 by upper and lower locking nuts 68, entered onto the piston rod and abutting against the upper and lower plates 65 of the piston, as shown in Figs. 11 and 12. The upper end of each piston rod is entered into the bottom wall 69 of a neck 70; and the extreme upper end of each piston rod 67 is screw threaded and has entered thereonto a packing ring 71, located in a chamber 72 of the neck 70 and compressed by a ring nut or follower 73, threaded into the bottom wall 74 of a bottle support. Each bottle support consists of the bottom wall 74, an end wall 75, a curved wall 76, and a side wall 77 on an angle, as shown in Figs. 10 and 11, so that, with the reciprocating movement of the piston in each cylinder 60, each bottle support will be raised and lowered to raise the bottle on the support into its filling position, and lower the bottle on each bottle support into position for removal. Each bottle support, in the construction shown, has, in its end wall 75 and inclined side wall 77, a slot 78, for a purpose to be hereinafter described.

The under face of each wall 51 of each upper head, and the upper face of each wall 52 of each lower head, has therein an annular slot 79, and in the slots 79 is entered the upper and lower ends of a tube 80, in the construction shown in Figs. 11 to 15 both inclusive. The under face of the wall 51 of each upper head and the upper face of the wall 52 of each lower head has formed therein an opening or hole 81, and into the holes or openings 81 is entered the upper and lower ends of an inner tube 82, constituting a hollow stem and having, in its wall, ports or holes 83 for admitting a medium under pressure. The wall 51 of each upper head of a motor cylinder has therein a tapered chamber 84, into which is entered a tapered valve plug 85; and each tapered valve plug 85 has a cross passage 86 which is in communication with a cross passage 87 in the wall 51, which passage 87 forms an inner and outer port for the wall 51, and the inner port is in communication with a port 88 in the wall of the cylinder 60, as shown in Figs. 11 and 12. Each valve plug 85 has in its inner end an L shaped passage 89, the vertical member of which opens through the end of the valve plug, and the horizontal member of which opens to the side of the valve plug, as shown in Figs. 11 and 12; and the horizontal member of the L shaped passage 89 can be brought into communication with a passage 90 in the wall 51, which is in communication with a port 91 in the wall of the motor cylinder 60, as shown in Figs. 11 and 12. The wall 51 of each upper head of the motor cylinder has a nipple 92 in which is an L shaped passage 93, the horizontal member of which opens through the end of the nipple, and the vertical member of which opens into a chamber or passage 94 between the outer cylinder 80 and the inner cylinder or stem 82, as shown in Figs. 11 and 12. Each nipple 92 has connected therewith one end of a hose or conduit 95, the other end of which is connected with the flange 19, so as to have communication with a passage 49 in the flange, for transmitting pressure from the passage or chamber 44 to the passage or chamber 94, between the outer tube 80 and the inner tube 82, for the pressure to pass through the ports 83 into the tube 82 and enter the power cylinder at each end, as the controlling valves for the pressure in the heads 51 and 52 are turned for the induction and eduction of pressure to the power cylinder.

The wall 52 of the lower head of each motor cylinder has formed therein a chamber 96, into which is entered a tapered valve plug 97 having a cross passage 98, which can be brought into communication with an outer port or passage 99 in the wall 52; and an inner port or passage 100 in the wall 52, and the inner end of the valve plug 97 has an L shaped passage 101 the vertical member of which opens to the end of the valve plug and the horizontal member of which opens to the side of the valve plug and can be brought into communication with a port or passage 102, opening into the chamber 59 below the piston of the motor cylinder, as shown in Figs. 11 and 12. Each valve plug 97 has a stem 103 at its outer end, which stem enters an arm 104 and is secured to the arm by a lock nut 105, or otherwise; and each arm 104 has, on its under face, a lug 106 and lug 107, which lugs are located on the arm, so that, as the motor cylinder is carried around with the rotation of the table or carrier 15, the lug 106 will engage with a stop 108 upwardly extending from the bed or base 1, and the lug 107 will engage with a stop 109 upwardly extending from the bed or base plate 1; and, as shown, a coil spring 110 is attached, at one end, to an eye 111 on each arm 104, and at the opposite end to an eye 112 on each wall 53, which spring serves to prevent the arm from being swung too far, by the engagement of the lug 107 with the stop 108 in operating the controlling valves.

The controlling valves or valve plugs 85 and 97 are simultaneously turned by the connecting hollow stem or tube 82, and this turning of the valve is automatically performed by each arm 104 of the lower valve plug 97, through its lugs 106 and 107 and the stops 108 and 109, as the motor cylinder is carried around with the rotation of the table or carrier 15, which supports the motor cylinders. The engagement of the lug 106, with the stop 108, swings the arm 104 into position to turn the valve plug 97 and the valve plug 85, so that the valve plug has its L shaped passage 101 turned to open communication between the hollow stem or tube 82, and the port or passage 102 for admitting pressure from the chamber 94 into the hollow stem or tube 82 through the ports 83 for the admitted pressure to flow through the L shaped passage 101 through the port or passage 102 into the chamber 59 below the piston in the cylinder 60, for the admitted pressure to act and force the piston upwardly in the cylinder 60, moving the stem 67 upwardly and raising the bottle support, with the bottle thereon, into filling position for the bottle; and at the same time the valve plug 85 is turned into the position shown in Fig. 11 for the pressure in the cylinder 60 above the piston to escape through the port 88, passage 86 and passage 87 into the atmosphere, freeing the cylinder 60 above the piston of pressure, and leaving the pressure admitted below the piston of the cylinder free to act and raise the piston and with it the bottle support. The ports and passages remain open as just described, for admitting pressure to raise the piston in each cylinder 60, until the rotating table or carrier 15 has carried each motor cylinder around to a point where the lug 107 engages the stop 109 to move the arm 104 in a reverse direction, turning the valve plug 97, and through the hollow connecting stem or tube 82 turning the valve plug 85 into the position shown in Fig. 12. The turning of the valve plugs 97 and 85 into the position shown in Fig. 12 brings the L shaped passage 89 into position to open communication between the hollow stem or tube 82 and the passage 90 and port 91, for pressure to flow from the chamber 94 through the ports 83 into the hollow stem or tube 82 and through the L shaped passage 89, passage 90 and port 91 into the motor cylinder 60, above the elevated piston of the cylinder, for the pressure to act on the piston and carry or force down the piston and with it the piston stem 67 and the bottle support carried thereby, lowering the bottle support and with it the bottle in position to be removed. The opening of the L shaped passage 89 for communication between the stem or tube 82 and the passage 90 and port 91 to admit pressure above the piston and carry or force the piston down, at the same time turns the valve plug 97 into position to open communication between the passage 98 and the ports 99 and 100, for discharging pressure from below the piston of the cylinder 60 as the piston descends, the discharged pressure venting to the atmosphere through the passage 98 and ports 99 and 100, discharging pressure from below the piston and leaving the pressure above the piston free to act and force or carry down the piston, and with it the bottle support and bottle, bringing the bottle into position for removal. It will thus be seen that by means of the arm 104 on each valve plug 97, the valve plugs 97 and 85 will be automatically turned as required to admit pressure below the piston and discharge pressure from above the piston in each motor cylinder, and to admit pressure above the piston and discharge pressure from below the piston of each motor cylinder, so that the bottle supports will be successively raised and lowered, as the motor cylinders are carried around by the rotation of the table or carrier 15 from which they are suspended, thus making the operation of raising and lowering the bottle supports successively, as the table or carrier rotates, automatically performed.

The construction shown in Figs. 16 to 20 both inclusive, employs horizontal valve plugs instead of vertical valve plugs, for controlling the induction and eduction of a medium under pressure, to operate the piston in the motor cylinder.

The construction of Figs. 16 to 20 has an upper head 113 for each motor cylinder, and its pressure supplying tube, and each head 113 has a depending annular rim or flange 114, into which is entered the upper end of the motor cylinder 60; and at one side each head 113 has a projecting boss 115, with a depending annular rim 116, into which is entered the upper end of the tube for conducting or supplying pressure to operate the piston of the motor cylinder. Each motor cylinder, in the construction of Figs. 16 to 20 inclusive, has a lower head 117, with an annular wall 118, into which is entered the lower end of the motor cylinder 60; and at one side each lower head 117 has a boss 119, with an upper annular wall 120, into which is entered the lower end of the tube for supplying a medium under pressure to operate the piston in the motor cylinder. The annular wall 118 of the lower head of each motor cylinder is closed at the bottom by a plug having a bottom wall 121 with a lug 122, for a wrench or other instrument, for entering the plug into the lower end of the wall 118, and the plug has an annular rim or wall 123, forming a chamber 124, constituting a continuation of the chamber below the piston of the motor cylinder, as shown in Figs. 17 and 18; and, as shown, the head 113 has in its under face a chamber 125, into which a medium under pressure is admitted above the piston of the motor cylinder, when the piston is raised. The upper head 113 of each motor cylinder has a neck 126, extending up from which is a screw threaded stem 127, by means of which and a locking nut, similar to the locking nut 64 of the construction shown in Figs. 11 and 12, each motor cylinder and its supply tube for a medium under pressure is secured to the under side of the rotatable table or carrier 15, so as to be suspended from and revolve with the table or carrier. Each motor cylinder 60 has therein a piston formed of upper and lower plates 65, and cup leather packing 66, which piston is attached to a piston stem 67 by locking nuts 68, as described for the construction of piston and stem of Figs. 11 and 12; and the piston stem passes up through a hole 128 in the head 113, and has attached to its upper end a bottle support, as described for the piston stem in the construction of Figs. 11 and 12.

The annular walls 116 and 120 of the upper and lower heads have entered thereinto the upper and lower ends of a tube 129; and the upper end of the tube 129 is in communication with the passage 93 of a nipple 92, so as to furnish communication between the nipple and the tube. The boss 115 of the upper head 113 has formed therein a tapered cross chamber 130, in which is entered a tapered valve plug 131, and the valve plug 131 has therein an L shaped passage 132, which can be brought into communication with a port 133, opening into the passage 93 of the nipple 92, or can be brought into communication with a discharge port 134, opening through the upper end of a boss 115, or can be brought into communication with a passage 135 in the head 113, opening into the chamber 125 at the upper end of the cylinder 60 in the head 113, so that when the L shaped passage 132 is in communication with the port 133 and the passage 135, communication is established to admit pressure from the passage 93 to the chamber 125, above the piston in the cylinder 60; and with the L shaped passage 132 in communication with the port 134, communication is established between the passage 135 and the port 134 to vent pressure from the chamber 125, above the piston in the motor cylinder.

The boss 119 of the lower head 117 has formed therein a tapered cross chamber or passage 136, into which is entered a tapered valve plug 137; and the valve plug 137 has therein an L shaped passage 138, both members of which open to the periphery of the valve plug, and this L shaped passage 138 can be brought into communication with an induction port 139, opening into the tube 129, or can be brought into communication with an eduction port 140, opening through the end of the head or boss 119, and when one member of the L shaped passage 138 is in communication with the induction port 139, the other member of said passage is in communication with a passage 141 in line with a port 142 in the wall of the motor cylinder 60, for supplying pressure to the motor cylinder, below the piston in said cylinder, as shown in Fig. 17; and when one member of the L shaped passage 138 is in communication with the eduction or discharge port 140, the other member of this L shaped passage is in communication with the passage 141 and the port 142, for discharging or venting pressure from the motor cylinder 60, below the piston as the piston descends. It will thus be seen that when the valve plug 131 is turned to admit pressure to the chamber 125 above the piston in the motor cylinder 60, the valve plug 137 will be turned to vent or discharge pressure from below the piston in the motor cylinder 60, and when the valve plug 137 is turned to admit pressure into the motor cylinder 60, the valve plug 131 will be turned to vent or discharge pressure from the motor cylinder 60, above the piston as the piston ascends.

The controlling valves or valve plugs 131 and 137 are simultaneously turned so as to open one valve and close the other valve and vice versa, in the arrangement shown in Figs. 16 to 20 both inclusive, by a connection between the valves or valve plugs. Each plug, at its base end, has entered thereonto a socket 143 of an arm 144, and the socket and arm are held on the plug by a threaded stem 145 and a locking nut 146. The outer or free ends of the two arms 144 are connected together by a cross bar 147, attached, at each end, to the arms 144, by a pivot or pin 148, so that, as the arm 147 is moved up and down, the two arms 144 will move in unison and simultaneously turn both controlling valves 131 and 137, as required to admit pressure into or discharge pressure from the opposite ends of the motor cylinder 60, for operating the piston in said cylinder. The cross bar 147 has secured thereto, midway of its length, as shown in Fig. 16, an arm 149, by means of which the arm 147 can be raised and lowered; and the raising and lowering of the arm 147 can be automatically performed, by means of a cam arranged to be engaged by the arm 144 as the table revolves, carrying around with it the motor cylinders.

The arm 147, when in its raised or elevated position, as shown in Fig. 16, through the arms 144, turns the valve plugs 131 and 137 to the position shown in Fig. 17, for admitting pressure, through the port 139, L shaped passage 138, passage 141 and port 142 into the chamber 59 below the piston in the cylinder 60, and with the admission of pressure below the piston the piston will be moved upward; and the valve plug 131, with the arms 144 raised, as in Fig. 16, will be turned to bring the L shaped passage 132 into communication with the passages 134 and 135, for discharging or venting pressure from the motor cylinder 60 above the piston, leaving the pressure admitted below the piston free to act and raise the piston. The downward movement of the cross bar 147 carries down or depresses the arms 144, and such carrying down or depressing of the arms 144 turns the valve plugs 131 and 137 simultaneously into the position shown in Fig. 18, and with the valve plugs turned, as in Fig. 18, the L shaped passage 132 is brought into communication with the induction port 133 and the passage 135, admitting pressure to the motor cylinder 60 above the piston in such cylinder; and the valve plug 137 is turned to bring the L shaped passage 138 into communication with the port 140, passage 141 and port 142, for discharging or venting pressure from the cylinder 60 below the piston, leaving the pressure above the piston free to act and force the piston downward. The upward movement of the piston elevates or raises the support for the bottle on the end of the piston stem 67, for the bottle to be brought into filling position, and the descent of the piston in the cylinder 60 carries down with it the piston stem, lowering the bottle support into position where the bottle can be removed. It will thus be seen that with the construction of Figs. 16 to 20 both inclusive, the bottle support will be successively raised and lowered, as the motor cylinders are carried around by the rotation of the table or carrier 15 from which they are suspended, thus raising the bottle into filling position and lowering the bottle into position for removal.

A filling tank for the liquid is attached to the upper end of the tubular or hollow revoluble shaft 22, so that the filling tank and the table will be rotated in unison. The filling tank shown has a bottom 150 and a side wall 151, and, preferably, is circular in cross section. The top of the tank is open for access to the interior thereof, and is closed for operation by a cover 152, having around its periphery, a plurality of ears or lugs 153, with a slot between the lugs extending into the edge of the body of the cover, which slot receives a clamping bolt 154 having thereon a wing nut 155, and each clamping bolt is mounted on a pin or pivot 156 in ears 157 on the outer face of the side wall of the tank at the top, as shown in Figs. 7 and 8, so that, by means of the wing nuts the cover 152 can be drawn tightly down against the flange at the upper end of the side wall of the tank; and between the cover and the flange, at the top of the side wall of the tank, is a packing ring 158 of rubber, or other suitable material, so as to make a tight joint, when the cover is down. The bottom 150 of the tank has, at the center, a downwardly extending hub or socket 159, with a square opening receiving the square upper end of the revoluble hollow or tubular shaft 22; and, as shown, the hub or socket 159 abuts against a flange 160 on the hollow or tubular shaft 22, and is secured to the flange by means of lag bolts 161, or otherwise, so that, as the shaft 22 is revolved, the filling tank and the devices carried thereby will also be revolved.

The upper end of the revoluble tubular or hollow shaft 22 has an inwardly extending shoulder or ledge 162, furnishing an opening through which the upper end of the liquid supply tube 43 extends and passes through the bottom 150 of the filling tank, as shown in Fig. 21. The upper end of the liquid supply tube 43 has an interior screw thread which receives a threaded neck 163, depending from a bottom 164, so that the neck furnishes a passage or opening 165 for discharging liquid into the filling tank. The neck 163 and bottom 164 constitute a part of a cage, having side walls 166 and openings 167, through which openings the liquid from the supply tube 43 can discharge into the filling tank. The cage, in the construction shown, has a cross wall 168 with a center hole or passage 169, and a top wall 170 with a central hole or passage 171, through which holes or passages a valve stem is entered. A float encircles the cage, as shown in Figs. 21 and 22, and this float is formed with an outer side wall 172, an inner side wall 173, a top wall 174, and a bottom wall 175, which walls inclose an air tight chamber 176; and, as shown, the inner wall 173 forms a passage 177 between the float and the cage, so as to allow the float to rise and fall freely. The top of the float has, on opposite sides, a pair of ears 178, each pair of ears being secured to the outer side of the float by a flange or ear 179 and a bolt 180, or otherwise. Each pair of ears has a cross pin or pivot 181, pivotally connecting the outer end of an arm or lever 182 between the ears; and the inner or forward end of each lever is connected by a pin or pivot 183 between ears 184 extending up from the top of the cage, so that the pivots 183 form fulcrums on which the arms or levers 182 operate. The extreme inner end of each arm or lever 182 has a rounded or curved edge 185, and this end of each arm or lever is entered into a space or opening 186, between an adjustable nut 187 on top and an adjustable nut 188 on the bottom, by means of which nuts 187 and 188 and a lock nut 189 on the bottom, the space 186 can be properly located, for the movements of the arms or levers 182 to operate the valve for closing the passage 165 for the liquid into the filling tank. The adjusting and locking nuts 187, 188 and 189 are threaded onto the upper end of a valve stem 190, which stem passes through the holes or openings 171 and 169, and at its lower end has attached thereto a valve 191, which, as shown, is of a double cone shape, but could be of other suitable shape, so long as the valve furnishes an acting face to coact with a seating face or edge 192 around the opening or passage 165, so that the raising of the valve, by the downward movement of the float through the arms or levers 182, will open the passage 165 for liquid to enter the filling tank, and the closing of the valve 191 against the seat or edge 192, by the upward movement of the float through the arms or levers 182, will shut off or stop the flow of liquid through the passage 165 into the filling tank.

The lowering of the liquid in the filling tank below a predetermined line of filling, as the liquid is withdrawn to fill the bottles, will allow the float to descend, carrying down with it the float; and the descent of the float carries down the ears 178 on each side, and with the descent of the ears the outer end of each lever 182 is lowered and the inner end of each arm or lever 182 is raised on the pivot or fulcrum 183; and the raising of the inner ends of the levers 182, through the engagement with the adjustable stop nut 187, raises the valve stem 190, and with it the valve 191, leaving the passage 165 open to discharge liquid from the supply tube 43 into the filling tank. The liquid discharged into the filling tank, as it rises therein, will raise the float, and the upward movement of the float carries with it the ears 178 on each side, raising the outer or free ends of the arms or levers 182 and depressing or carrying down the inner ends of the arms or levers 182 on the fulcrum or pivots 183, and such depression of the inner ends of the arms or levers 182, through engagement with the under stop nut 188, carries down the valve stem 190, and with it the valve 191, closing the passage 165 against the inflow of liquid from the supply tube 43 into the filling tank. It will thus be seen that by means of the float and the arms or levers 182, in connection with the stop nuts 187 and 188, the controlling valve for admitting liquid into the filling tank will be automatically raised and lowered, as required for supplying liquid to the filling tank, or stopping the inflow of liquid into the filling tank.

The bottom 150, of the filling tank, has entered thereinto, adjacent to its periphery, and within the outer or circumferential wall 151, a plurality of connecting plugs, each plug receiving and sustaining a filling tube. Each plug is formed with a flange 193 and an annular wall or rim 194, having an exterior screw thread to receive a ring nut 195, by means of which and the flange 193 the plug is tightly secured in the bottom 150 of the filling tank, and at the same time the attachment is a removable one. A tube or cylinder 196 is entered through the plug opening, and extends above and below the plug, as shown in Figs. 26, 27 and 28. The upper end of the tube or cylinder 196 is closed by a head 197, having a neck 198 with an exterior screw thread and a chamber 199 encircled by the wall of the neck.

A closing cap, having a peripheral wall 200, and a top wall 201, is threaded onto the exterior of the neck 198; and the top wall 201 has therein a hole 202, for the passage of the end of a siphon tube 203, the receiving end of which extends downward into the filling tank and is entered into a neck or annular wall 204 of a cage 205, with a cross wall 206, between the neck and the chamber of the cage, in which cross wall is a port or passage 207 opening into the interior of the siphon tube, as shown in Figs. 26 and 27. The chamber 208 of the cage or shell 205 has located therein a check valve, 209, which, as shown is held from dropping out from the chamber 208 by a cross rod or bar 210, and this check valve will be raised by the pressure in the filling tank in the event of a defective bottle, or seal, or otherwise, so as to close the port 207, and prevent the liquid from entering the siphon tube; but with a perfect bottle and seal the check valve will remain down or dropped, allowing the liquid to enter the siphon tube. The discharge or inner end of the siphon tube has a head 211, with a shoulder which abuts against the under face of the closing cap plate 201, so that the siphon tube is connected with the head 197; and the head 211 has a chamber 212 in which is located a check valve 213, which is supported against falling out of the chamber by means of a cross rod or wire 214, which valve is for the purpose of preventing syrup discharged into the filling tube from flowing backward and entering into the liquid within the tank.

A filling tube 215 is entered into a hole or passage in the head 197, which hole or passage is in communication with the chamber 212 in the head 211 of the siphon tube, so that liquid can flow through the siphon tube and enter the filling tube to be discharged therefrom into the bottle. A tube 216 encircles the filling tube within the outer tube or cylinder 196, forming a space or passage 217, between the tube 216 and the filling tube 215, and a space or chamber 218 between the tube 216 and the outer tube or cylinder 196, as shown in Figs. 26, 27 and 28. The upper end of the intermediate tube 216 is threaded, or otherwise secured, in the head 197; and adjacent to the upper end of this intermediate tube 216 are ports 219 which communicate with passages 220 in the head, which passages 220 open to the exterior of the head, so as to admit pressure from above the liquid in the filling tank into the space or passage 217 between the intermediate tube 216 and the filling tube 215; and on one side of the intermediate tube 216, near the upper end thereof, is a hole 221 in communication with a passage 222, which passage is in communication with a hole 223 in the wall of the outer tube or cylinder 196, which holes and passage are for a purpose to be hereinafter described.

The lower end of the intermediate tube 216 is entered into a head 224, having a flange 225 with a chamber 226 in which is located a packing 227, compressed by a follower or gland 228, so as to make a tight joint around the intermediate tube 216, and at the same time allow the head 224 to slide up and down on the tube. A packing 229 encircles the head 224 below the flange 225, and is compressed by a ring follower 230 threaded into the end of the plug of the head; and the lower end of the tube or cylinder 196 has entered thereonto a closing cap, formed of an annular rim or wall 231, threaded onto the tube or cylinder, and an end wall 232 having a central hole therein, so that the head 224, in connection with the packing rings and glands or followers, constitutes a piston operating within the chamber or space 218 and around the intermediate tube 216, for the piston to be moved up and down on the intermediate tube and between the intermediate tube and the outer tube or cylinder. A tube 233 has its upper end threaded, or otherwise secured, in the head or piston around the intermediate tube 216, and is free to slide up and down on such tube. The tube 233 encircles the filling tube 215, so as to leave a space or passage 234 between the two tubes, which space or passage is a continuation of the space or passage 217, for pressure to pass from the interior of the tank between the tubes. The lower end of the tube 233 is threaded, or otherwise, entered into a coupling 235 having a bottom wall 236 with a hole 237, through which the filling tube 215 passes. The coupling 235 is threaded into the upper end of a head or casing 238, the lower end of which has an exterior screw thread onto which is threaded a flange or rim 239 of a wall 240, with an abutting shoulder 241, so as to make a tight joint between the head 238 and the wall 240, when the parts are together. The wall 240 has a curved lower inner face 242, forming a flaring opening 243; and the curved inner face 242 terminates in a shoulder or ledge 244, forming a chamber to receive a packing ring 245, which is held in position between the shoulder 244 and the end face of the head 238, when the parts are assembled. The under side of the packing 245 has formed therein a tapered or concave face 246, inclosing a conical or tapered opening 247, into which is entered the extreme end of the bottle neck, as shown by dotted lines in Figs. 27 and 28.

The head 238, in the construction shown in Figs. 26, 27 and 28, has a cross wall 248 with a central hole or opening; and below the cross wall or flange 248 a chamber 249 is formed in the head; and in the chamber 249, below the cross wall or flange 248, is a packing ring 250, compressed by a follower or ring 251 having in its inner face a circumferential channel or passage 252; and below the follower or ring 251, in the chamber 249 of the head 238, is a packing ring 253, which is compressed by a ring follower or gland 254, threaded into the wall of the head at the lower end thereof. An endwise slidable stem 255 is entered into the hole in the cross wall 248, and is encircled by the packing rings 250 and 253, and the followers or glands 249 and 254, so that the stem 255 is free to move endwise, but is tightly packed against the escape of pressure and liquid. The lower end of the stem 255 has a hole of a larger diameter than the cross diameter of the filling tube, so as to furnish a passage 256, between the exterior of the filling tube and the stem; and this chamber or passage 256, at its upper end, has a cross port 257 extending through the wall of the stem 255, and in communication with the circumferential passage 252 for follower or ring 251, for the admission of pressure into the bottle. The upper end of the stem 255 has a head or flange 258, in the end of which is a chamber 259 receiving a packing ring 260, which is compressed by a gland or follower 261, so as to make a tight joint around the filling tube without interfering with the endwise movement of the stem 255 on the filling tube as a support. The head or flange 258 is located and operates in a chamber 262, into which the hole 237 opens, so as to admit pressure from the passage 234 into the chamber 262; and leading from the chamber 262, on one side, is an L shaped passage 263, one member of which communicates with the chamber 262, and the other member of which communicates with a chamber 264 having, at the lower end, thereof, a cross port 265, formed in the wall of the head and in communication with a port 266 formed in the follower or ring 251, so that pressure can flow from the chamber 262 into the passage 256 to enter the bottle, when the neck of the bottle has its end engaged by or with the packing 245, which packing, in connection with the head 238 and the wall 240, constitutes a sealing head for the end of the bottle. The chamber 244 has located and operating therein a float valve 267, with an acting or seating head 268, by means of which the L shaped passage 263 can be closed against any flow of pressure, in the event of an overflow of liquid from a filled bottle entering the passage 256 and flowing into the chamber 264 by the ports 257, 265 and 266, thus preventing the liquid from flowing upwardly into the passage 234 for the pressure.

The operation of the filling tube and the sealing head, in the construction shown in Figs. 26, 27 and 28, is as follows: As a bottle is elevated, by the upward movement of the support on which it is carried, the neck of such bottle will enter the opening 243, and if off center, will be guided and directed by the curved face 242 into the opening 247, and be guided by the tapered walls 246 of the sealing ring into position for the end wall or face of the bottle neck to engage the end of the stem 255, so that, as the bottle continues its upward movement, the stem 255 will be moved upward a sufficient distance to bring the port 257 into communication with the passage 255, allowing pressure to enter the passage 256 from the chamber 264, through the ports 265, and 266, equalizing the pressure between the filling tank and the bottle, by pressure from the filling tank entering the passage 234 from the passage 217 and the ports 220, the pressure from the passage 234 entering the chamber 262 through the port or hole 237, and flowing from the chamber 262 through the passage 263 into the chamber 264 to pass from the chamber into the bottle. The stem 265 is maintained in its elevated position by the engagement of the end face of the bottle neck with the end of the stem, maintaining communication open between the filling tank and the bottle, while the bottle is being filled with the liquid, allowing pressure to escape from the bottle as the liquid flows into the bottle, the escaping pressure flowing back into the filling tank through the ports and passages by which it was supplied to the bottle from the filling tank. It will thus be seen that, with the entering of the neck of the bottle into the sealing head for the end face of the neck to engage the lower end of the stem 255, the stem will be raised sufficiently to open communication between the filling tank and the bottle, for equalizing the pressure between the filling tank and the bottle, and such communication will remain open so long as the liquid discharges into the bottle for filling the bottle. The liquid, in the event of an overfilling of the bottle, will flow into the passage 256 and discharge into the chamber 264, through the ports 257, 265 and 266; and as the liquid flows into the chamber 264 the float valve 267 will be raised for its seating or acting end 268 to enter the L shaped passage 263, preventing any liquid from the chamber 264 entering the chamber 262 and passing into the passage 234, and interfering with the flow of pressure through such passage from liquid therein.

The sealing head, shown in Figs. 29, 30, and 31, has a modified construction, as compared with the sealing head of Figs. 26, 27 and 28, as to the formation of the valve or piston controlling the admission of a medium under pressure into a bottle for equalizing the pressure. The sealing head of Figs. 29, 30 and 31 has the head or casing 238, the wall 240, the packing ring 245, similar to the sealing head of Figs. 26, 27 and 28; and the wall 238 has the L shaped passage 263, the chamber 264, the float valve 267, with its acting end 268 and the port 265, similar to the corresponding parts of the head of Figs. 26, 27 and 28. The head or casing 238, of the form shown in Figs. 29, 30 and 31, has a chamber 269, with a bottom wall 270, having a central hole. A head 271, with a depending stem 272, passing through the hole in the bottom wall 270, is located and operates in the chamber 269, and this head 271, on its upper side or face, has a channel packing 273 secured to the head by a ring 274, and suitable screws 275, or otherwise, so as to make a tight joint between the piston and the wall of the head 238 and the exterior of the filling tube 215, against the escape of pressure and liquid around the head. The under side or face of the head 271 has a packing 276 of angle formation, secured in place by a ring nut 277, so as to make a tight joint between the head 271 and the wall of the casing or head 238 against leakage of pressure. The head 271, with the packing rings thereon, constitute a piston valve for controlling the admission of pressure from the chamber 264 into the bottle. The stem 278 has a central bore or hole of greater diameter than the cross diameter of the filling tube, so as to form a channel or passage 278 between the wall of the stem and the filling tube; and this channel 278 communicates with a longitudinal passage or port 279 in the head 271 and opening to the exterior of the head.

The operation of the piston valve controlling the admission of pressure to the bottle, in the construction of Figs. 29, 30 and 31, is practically the same as the operation of the piston valve in the construction of sealing head of Figs. 26, 27 and 28. The end face of the neck of an entered bottle into the packing or sealing ring 245 will engage the end face of the stem 272; and, with the full seating of the end of the bottle in the packing or sealing ring, the stem 272, and with it the piston valve, will be raised a sufficient distance for the port 279 to be in communication with the port 265, and allow the medium under pressure to flow from the chamber 264 into the passage 278, and equalize the pressure between the filling tank and the bottle, as described for the operation of a sealing head in the construction of Figs. 26, 27 and 28.

The lower end of the filling tube 215 has an end port 280 for discharging liquid from the filling tube into the bottle; and around the inner face of this port 280 is a seating face 281, which coacts with the seating face 282 of a valve, the body 283 of which is within the filling tube, as shown in Figs. 38 and 39; and depending from the seating face 282 of the valve is a stem 284, which projects through the discharge port 280, and, with the full entrance of the filling tube into the bottle, the end of the stem 284 strikes the bottom of the bottle and opens the valve, as shown in Fig. 39, allowing liquid to discharge through the port 280 into the bottle. The stem 284 is caused to engage the bottom of the bottle when the bottle has been raised by its support to the limit of the upward movement; and, with the initial descent of the bottle, the valve within the filling tube drops by gravity for the seating face 282 to engage the seating face 281, and shut off the flow of liquid, as shown in Fig. 38. It will be understood that, in the operation of the sealing head and filling tube the valve controlling the admission of pressure into the bottle, to equalize the pressure, will be operated with the initial upward movement of the neck of the bottle in entering the sealing head, and that the valve controlling the discharge of liquid from the filling tube, will not be opened until the bottle has been raised to fully enter the filling tube within the bottle, the result being that the pressure between the filling tank and the bottle has been equalized, and remains equalized before and during the discharge of liquid into the bottle; and the liquid entering the bottle will force the pressure back into the filling tank, as hereinbefore described for the operation of the sealing head.

It is desirable, where the machine of the present invention is to be used in connection with a liquid having a flavoring syrup combined therewith, that means should be provided for supplying syrup to the bottle with the liquid, and means for this purpose are attached to the filling tank, so as to rotate with the tank and the filling tube. Each syrup supplying device, in the construction shown, has a receptacle formed of a side wall 285 and a top wall 286, with a removable bottom formed of a cross wall 287 and a flange or rim 288, screw threaded, or otherwise attached to the lower end of the wall 285 of the syrup receptacle. The side top and bottom walls of the syrup receptacle inclose a chamber 289, into which the charge of syrup is admitted, and from which the charge of syrup is ejected or discharged to enter the filling tube. The top wall 286 has a neck 290, onto which is screw threaded, or otherwise secured, a supply pipe 291 leading from a reservoir for the syrup. The neck has a passage 292 opening into a chamber 293 formed in the top wall; and a valve 294 is located and operates in the chamber 293; and, as shown, the upper face of the valve 294 carries a packing 295 to seat against the upper wall or end of the chamber. The valve 294 has a stem 296 which passes through a guide hole or opening 297 formed in a cross bar 298, with an annular ring 299 which, as shown, is threaded into a recess therefor in the under face of the top wall 286; and between the cross bar 298 and ring 299 are openings 300 which allow the syrup to flow from the chamber 293 in the chamber 289 for supplying the chamber with the required charge of syrup.

A piston 301 is located and operates in the chamber 289, and this piston is attached to the inner end of a piston stem 302, which passes through a hole 303 therefor in the bottom wall 287 of the syrup receptacle; and the bottom wall 287 has a depending rim or flange 304 inclosing a chamber 305, and having an interior screw thread, into which chamber is entered a packing 306, which packing is compressed around the piston stem 302, so as to make a tight joint, by a plug or gland 307 threaded into the flange or rim 304 and encircling the piston stem. The plug or flange 307 has a flange 308, depending from which is a tube 309, having an interior screw thread; and into the tube 309 is threaded a tube 310 having an exterior screw thread. The tube 310 has a cross end wall 311, with a port 312 for venting air from within the tube. The outer end of the piston stem 302 has thereon an adjustable nut 313 and a lock nut 314; and between the adjustable nut 313 and the end face of the plug or gland 307, around the piston stem, is a coil spring 315 which serves to return the piston 301 from its elevated position to its normal position after discharging the charge of syrup within the chamber. The bottom wall 287 of the receptacle has formed therein a port 316, with a screw threaded outer portion into which is entered the end of a pressure supply tube 317 for admitting pressure beneath the piston 301, and forcing the piston upward in the chamber 289, to eject the charge of syrup from the chamber.

The inner end of each pressure supply tube 317 is connected by a coupling 318, with a tube or nozzle 319, the extreme end 320 of which is screw threaded and has a collar or flange 321, for the screw threaded end 320 to be entered into a threaded hole 322 in the wall of the revoluble tubular or hollow shaft 22, connecting the syrup receptacle with the pressure passage 44 within the revoluble hollow or tubular shaft, so that pressure can flow from the passage 44, through the tube or nozzle 319 and tube or conduit 317, and enter the chamber 289 of the syrup receptacle below the piston 301, for the pressure to act and force the piston upward. The tube or nozzle 319 has thereon a valve casing 323, with a tapered chamber in which is entered a tapered valve plug 324, and the valve plug is held in the chamber by a lock washer 325 and a set screw 326, as usual in holding a valve plug in its casing. The valve plug 324 has a cross passage or port 327, which can be brought into communication with a longitudinal passage 328 in the tube or nozzle 319, so as to furnish an open passage for pressure through the nozzle. The valve casing, on one side, has a discharge port 329, with which a lateral port 330 in the valve plug 324, opening from the cross passage or port 327, can be brought into communication for venting the discharged pressure from the chamber 289 beneath the piston 301, as the piston descends the pressure beneath the piston outflowing from the chamber 289, through the pipe or conduit 317, and the passage 328 in the tube or nozzle 319, when the valve plug is turned, as shown in Fig. 46; and with the valve plug turned, as in Fig. 47, the pressure is free to flow from the passage 44 in the revoluble tube or hollow shaft 22, into the chamber 289 beneath the piston 301, to elevate or force upward the piston.

The projecting end of each valve plug 324 has a square neck 331, which receives a square loop 332 at the end of a rod or bar 333; and the outer end of the bar 333 is connected by a pivot 334 with the upper end of a rod or bar 335, the lower end of which is connected by a pin or pivot 336 with the sealing head, so that, with the upward movement of the sealing head the rod or bar 335 will be raised and with it the outer or lower end of the bar 333, rocking the valve plug 324 in a direction to bring the passage 327 in alinement with the passage 328, opening the valve for pressure to flow from the passage 44 in the revoluble hollow or tubular shaft 22, through the nozzle or tube 319 and the tube or conduit 317, into the chamber 289 below the piston 301, for the pressure to act and raise the piston. The opening of the valve or valve plug 324, to admit pressure for operating the piston in the chamber 289, is automatically performed with the upward movement of the sealing head, as the bottle is raised with the raising of the support; and with the descent of the bottle support and bottle the sealing head returns to normal position, and such return of the sealing head to normal position carries down the rod or bar 335 and the rod or bar 333, turning the valve plug 324 into the position shown in Fig. 46, for venting pressure from the chamber 289, as the piston 301 is returned to normal position in the chamber by the action of the coil spring 315, for the reception of another charge of syrup within the chamber of the syrup receptacle.

The upward movement of the piston 301 discharges the syrup, from above the piston in the chamber 289, through a port 337 in the top wall of the syrup receptacle, which port opens into a chamber 338, formed in a boss 339 on one side of the top wall of the syrup receptacle, as shown in Figs. 40, 41, 42 and 44. The chamber 338 is closed by a plug 340 having a flange 341, between which and the end wall of the boss 339 is a packing 342, for making a tight joint against the escape of syrup from the chamber. A valve 343 is located and operates in the chamber 338, and this valve has a stem 344 to enter the port 337 and close the port against the escape of syrup, until the valve is raised by the pressure of the syrup against the end of the stem; and, as shown, the bottom of the chamber, around the port 337, has a packing ring 345, against which the end face of the valve seats, so as to make a tight joint at the bottom of the chamber 338 between the port 337 and the valve. The body of the valve has a recess or hole 346, into which is entered a coil spring 347, the upper end of which abuts against the end face of the plug 340, and this spring serves to return the valve to its closed position, after each discharge of the syrup. The valve 294 is open, as shown in Fig. 40, and the valve 343 is closed, as shown in the same figure, when the piston is down, as shown in Fig. 40, so as to allow a charge of syrup to flow from the syrup reservoir through the tube 291 into the chamber 289 of the syrup receptacle. The upward movement of the piston 301, to discharge or eject the charge of syrup from the chamber 289, raises the valve 294, shutting off the inflow of syrup through the passage 292, into the chamber 293, and also raises the valve 343, so as to open the port 337 and allow the syrup, forced out by the upward movement of the piston, to enter the chamber 338 and be discharged from such chamber into the filling tube. The syrup is discharged from the chamber 338 through a passage 348 in a tube 349, which tube passes through a hole 350 in the wall 151 of the filling tank and through the hole 223 of the tube or cylinder 196, the hole or passage 222 of the closing head 197, and the hole or passage 221 of the intermediate tube 266, and enters a hole 351 in the filling tube, as shown in Fig. 40, so that syrup, discharged through the passage 348, will be forced into and enter the filling tube, to descend by gravity and flow down in the filling tube to enter the bottle for flavoring the contents of the bottle with a syrup. The tube 349, when entered into position, is locked and held in position, by a set nut 352, abutting against the face of the tube or cylinder 196, and a set nut 353, abutting against the inner face of the wall 151 of the filling tank, and a shoulder 354 formed on the top wall of the syrup receptacle, as shown in Fig. 40.

A syrup reservoir for containing a quantity of syrup, in the construction shown, is mounted on top of the cover 152. This reservoir, as shown, has a side wall 355 and a cover 356, attached by bolts 357 or otherwise, to the upper end of the side wall; and at the center of the cover 356 is a boss 358, into which is entered a pipe 359, leading from a barrel or other syrup container, not shown. The several supply tubes 291 for the plurality of syrup receptacles, are each connected with the syrup reservoir by a suitable coupling 360, located near the bottom of the reservoir; and each syrup supply pipe 291 has a downward inclination, so that syrup from the reservoir will flow by gravity through the pipe and into the syrup receptacle, for charging the receptacle with the required amount of syrup. It will be understood that the quantity of syrup admitted to each receptacle will depend upon the position of the piston 301 in the chamber 289 of the receptacle. The higher the piston, when in normal position in the chamber, the smaller the amount of syrup admitted into the receptacle, and the height of the piston in the receptacle can be graded by means of the adjustable tube 310, as the higher the tube 310 is adjusted the less will be the descent of the piston 301 to its normal position. It will thus be seen that by the piston and the adjustable tube 310, in connection with the coil spring, the piston can be adjusted at varying heights in the chamber 289, when in normal position, so as to increase or diminish the amount of syrup received in to the receptacle for each charge.

The operation of the syrup receptacle, in supplying syrup to the liquid tube, is as follows: The chamber 289 is charged with the amount of syrup required, with the piston down or in its normal position, and such charging of the chamber occurs with the sealing head down and in normal position. The upward movement of the sealing head, from the engagement of the neck of the bottle therewith, as the support for the bottle is elevated by the motor cylinder, raises the operating rods 335 and 333, turning the valve plug 324 to open communication between the passage 44 of the revoluble hollow or tubular shaft 22 and the chamber 289 of the syrup receptacle; and with the admission of pressure into the chamber 289 below the piston 301, the piston will be forced upward and discharge the syrup, in the chamber 289 above the piston, through the port 337 into the chamber 338, and the syrup thus discharged will be forced through the passage 348 of the tube 349 into the filling tube 215, to descend in said tube and enter the bottle for flavoring the contents of the bottle with the syrup. The upward movement of the piston 301 continues until the sealing head has been elevated the required distance to enter the filling tube within the bottle; and with the cessation of the upward movement of the sealing head the piston 301 will have discharged the contents of the receptacle into the filling tube, so that, as the filling tube is opened by the raising of the controlling valve at the lower end thereof, the bottle will have therein the required amount of syrup to be mixed with the liquid discharged into the bottle for flavoring the liquid. The descent of the filled bottle, by the downward movement of the support for the bottle, carries down with it the sealing head, and with the descent of the sealing head the rods 335 and 333 are carried downward, closing the valve plug 324 against the flow of pressure into the chamber of the syrup receptacle; and with the return of the sealing head to normal position the valve plug 324 will be turned into position for the ports 329 and 330 to be brought into communication, allowing pressure to vent from the chamber 289 beneath the piston 301, for the coil spring 315 to return the piston 301 to its normal position. It will thus be seen that the charging of the bottle, with the flavoring syrup, is automatically performed as the bottle is elevated into its filling position, requiring no attention on the part of the attendant to charge the bottle with the syrup before filling. The chamber 289 of the syrup receptacle will be filled, after each discharge, from the syrup flowing through the supply pipe 291 from the syrup reservoir, and this reservoir will be kept full from the barrel or other source of supply until the supply is exhausted.

A tube 361, leads from the pressure passage 44 of the revoluble hollow or tubular shaft 22, and is entered into a pressure regulator 362, from which a tube 363 leads, which passes through the bottom 150 of the filling tank and terminates at a point within the filling tank above the liquid in the tank, so as to supply pressure to the chamber of the tank above the liquid, which pressure maintains the liquid in the tank at a predetermined height, and also supplies the pressure to the to-be filled bottle, by means of the passage 234 and the controlling valve for pressure in the sealing head, for equalizing the pressure between the tank and the to-be filled bottle. A pressure gage 364 is connected with the lead pipe 363, for determining the pressure supplied from the pressure regulator 362, through the pipe 363 to the chamber of the filling tank.

The filled bottle, in the arrangement shown, is automatically removed from the support therefor, as the table 15 rotates, in the construction shown, but the filled bottle could be removed by the operator, if so desired. The means for automatically removing the filled bottle from the support, in the construction shown in Figs. 1 and 10, consists of a bar or arm 365, attached by ears 366 and bolts 367 to a support at one side of the machine; and the bar or arm 365 is located and arranged for its inner end to be in line with the slot 78 of the several bottle supports, when in normal position, so that, as the table 15 rotates, carrying around the bottle supports, the arm or bar 365 will be passed by the slot 78 of each bottle support respectively, for the inner end of the arm to engage the body of the bottle and move the bottle outward and in engagement with the inclined wall 77 of the bottle support, forcing the bottle clear of the periphery of the rotatable table 15 and in position to be removed. The bottle, forced from the bottle support by the engagement of the arm 365, is carried against a guard or plate 368, having ears 369 at the bottom, each ear 369 having a slot 370, through which a bolt 371 passes, for attaching the guard or plate 368 to the bed or plate on which it is mounted.

The slots 370 enable the guard or plate 368 to be adjusted, so as to occupy the proper position for the body of the bottle to engage therewith and be moved outward by the successive bottles removed from the succeeding supports. The bottles, on the bed or support, can be removed by hand, or by an endless conveyer, not shown. The arm or bar 365 and the guard or plate 368, in the arrangement shown, are attached to a bed plate or support 372, having a base 373 which is bolted, or otherwise secured, to a side bracket 374 having an end flange 375 and connected with the post or upright 2, as shown in Fig. 1. The arm or bar 365, of Figs. 1 and 10, is a single piece or continuous, but instead of a bar or arm of a single piece, a bar or arm formed in two sections, one section, 376, attached by ears 366 and bolts 367 to the bed or plate 372, and the other section, 377, connected by a pivot 378 with the section 376, and the pivoted section 377 is held, with sufficient rigidity to remove a bottle from the support, by a spring 379, attached to the rigid section 376, and bearing against the pivoted section 378, which spring will allow the arm section 377 to yield, in the event a bottle becomes struck from any cause, thus preventing the bottle from being broken, as might be the case with the continuous rigid arm or bar 365 of the construction of Figs. 1 and 10.

The operation of the various mechanisms and appliances entering into the construction of the bottle filling machine of the present invention, are dependent on the rotation of the table or carrier 15; and all of the mechanisms and appliances have a unity of operation in filling bottles with liquid. The rotatable table or carrier, as it rotates, carries around with it the revoluble hollow or tubular shaft 22, and the motor cylinders, filling tank, filling tubes and syrup receptacles are carried around in unison. The motor cylinders are successively actuated to elevate the bottles in succession, and, as each bottle is elevated and initially enters the sealing head in line therewith, the valve controlling the admission of pressure into the bottle, for equalizing the pressure between the filling tank and the bottle, is actuated, and this without any cessation in the rotation of the table or carrier. The continued elevation or upward movement of each bottle support, carrying with it the bottle thereon, through the engagement of the neck of the bottle with the sealing head, raises the sealing head, and such raising of the sealing head enters the filling tube into the interior of the bottle, and this without any cessation in the rotation of the table or carrier. The full entrance of the filling tube into the bottle, terminating in the engagement of the stem of the valve controlling the discharge port at the end of the filling tube, opens the filling tube to discharge liquid into the bottle to fill the bottle, and during the filling of the bottle the table or carrier continues to rotate. The upward movement of the sealing head, while the filling tube is entering the bottle, opens the controlling valve for admitting pressure to the chamber of the syrup receptacle, beneath the piston in said chamber, for the pressure to act and raise the piston in the chamber, discharging the syrup above the piston in the chamber into the filling tube to flow down by gravity through the filling tube and deposit the syrup in the bottle, for the syrup to flavor the liquid in the bottle, and during the operation of supplying syrup to the bottle the table or carrier continues its rotation. It will thus be seen that the operation of the various mechanisms and appliances, entering into the construction of the machine for filling bottles with liquids of the present invention, are dependent on the rotation of the table or carrier, and that the operation of the mechanisms and appliances is automatic and is attained without cessation in the rotation of the table or carrier. The filled bottle is also automatically removed from its support, as the table or carrier rotates, thus making the entire operation of filling and removing a bottle automatic with and from the rotation of the table or carrier.

What I claim as new and desire to secure by Letters Patent is:

1. In a machine for bottling liquids, the combination of a hollow main standard, a rotatable table mounted and rotatable on the upper end of the standard, an upper head depending from and carried by the rotatable, a lower head coinciding with the upper head, a power cylinder between the upper and lower heads, a pressure tube between the upper and lower heads and adapted to be brought into communication with the power cylinder at each end thereof, a rotatable pressure controlling valve in the upper head, a rotatable pressure controlling valve in the lower head, a connection between the upper and lower pressure controlling valves, means for simultaneously rotating both valves for one valve to induct and the other valve to educt pressure between the pressure tube and the power cylinder at each end of the cylinder, means for supplying pressure to the pressure tube, a piston in the power cylinder actuated in both directions by pressure admitted to the opposite sides of the piston in the power cylinder, a reciprocating stem for the piston, and a bottle support connected with the piston stem for both raising the bottle into filling position and lowering the bottle for removal after filling, substantially as described.

2. In a machine for bottling liquids, the combination of a hollow main standard, a rotatable table mounted and rotatable on the upper end of the standard, an upper head depending from and carried by the rotatable table, a lower head coinciding with the upper head, a power cylinder between the upper and lower heads, a pressure tube between the upper and lower heads and adapted to be brought into communication with the power cylinder at each end thereof, a pressure controlling valve in the upper head, a pressure controlling valve in the lower head, a hollow rod or stem connecting the upper and lower pressure controlling valves and having a plurality of holes in its wall for admitting pressure from the pressure tube into the hollow valve rod, means for simultaneously operating both valves for one valve to induct and the other valve to educt pressure between the pressure tube and the power cylinder at each end of the cylinder, means for supplying pressure to the pressure tube, a piston in the power cylinder actuated in both directions by pressure admitted to the opposite sides of the piston in the power cylinder, a reciprocating stem for the piston, and a bottle support connected with the piston stem for both raising the bottle into filling position and lowering the bottle for removal after filling, substantially as described.

3. In a machine for bottling liquids, the combination of a hollow main standard, a rotatable table mounted and rotatable on the upper end of the standard, an upper head depending from and carried by the rotatable table, a lower head coinciding with the upper head, a power cylinder mounted between the upper and lower heads, a pressure tube mounted between the upper and lower heads, a pressure controlling valve in the upper head having an induction passage for pressure in communication with the pressure tube, and an eduction passage for pressure, the induction passage of the valve adapted to be brought into communication with an induction passage in the upper head and an induction port in the power cylinder, and the eduction passage of the valve adapted to be brought into communication with an education passage in the head and an eduction port in the power cylinder, a pressure controlling valve in the lower head having an induction passage for pressure, in communication with the pressure tube, and an eduction passage, the induction passage of the valve adapted to be brought into communication with an induction passage in the lower head opening below the power cylinder, and the eduction passage of the valve adapted to be brought into communication with an eduction passage in the head opening below the power cylinder, a connection between the upper and lower pressure controlling valves, means for simultaneously operating both valves for one valve to induct pressure and the other valve to educt pressure at the same time between the pressure tube and the power cylinder at each end of the cylinder, means for supplying pressure to the pressure tube, a piston in the power cylinder operating between the induction and eduction passages of the upper and lower heads and actuated in both directions by pressure admitted to the opposite sides of the piston in the power cylinder through the induction passages of the upper and lower heads, a reciprocating piston stem for the piston, and a bottle support connected with the piston stem for both raising the bottle into filling position and lowering the bottle for removal after filling, substantially as described.

4. In a machine for bottling liquids, the combination of a hollow main standard, a rotatable table mounted and rotatable on the upper end of the standard, an upper head depending from and carried by the rotatable table, a lower head coinciding with the upper head, a power cylinder mounted between the upper and lower heads, a pressure tube mounted between the upper and lower heads, a pressure controlling valve in the upper head having an induction passage for pressure, in communication with the pressure tube, and an eduction passage for pressure, the induction passage of the valve adapted to be brought into communication with an induction passage in the upper head and an induction port in the power cylinder and the eduction passage of the valve adapted to be brought into communication with an eduction passage in the head and an eduction port in the power cylinder, a pressure controlling valve in the lower head having an induction passage for pressure, in communication with the pressure tube, and an eduction passage, the induction passage of the valve adapted to be brought into communication with an induction passage in the lower head opening below the power cylinder, and the eduction passage of the valve adapted to be brought into communication with an eduction passage in the head opening below the power cylinder, a hollow rod or stem connecting the upper and lower pressure controlling valves and having a plurality of holes in its wall for admitting pressure from the pressure tube into the hollow valve rod, means for simultaneously operating both valves for one valve to induct pressure and the other valve to educt pressure at the same time between the pressure tube and the power cylinder at each end of the cylinder, means for supplying pressure to the pressure tube, a piston in the power cylinder operating between the induction and eduction passages of the upper and lower heads and actuated in both directions by pressure admitted to the opposite sides of the piston in the power cylinder through the induction passages of the upper and lower heads, a reciprocating piston stem for the piston, and a bottle support connected with the piston stem for both raising the bottle into filling position and lowering the bottle for removal after filling, substantially as described.

5. In a machine for bottling liquids, the combination of a rotatable table, a power cylinder suspended from and rotatable with the table, a pressure tube suspended from and rotatable with the table and located in correlation to the power cylinder and having communication at each end with the power cylinder, a rotatable valve at the upper end of the pressure tube controlling the induction of pressure into the power cylinder from the pressure tube and the eduction of pressure from the power cylinder, a rotatable valve at the lower end of the pressure tube controlling the induction of pressure into the power cylinder from the pressure tube and the eduction of pressure from the power cylinder, a connection between the two valves, and means for simultaneously rotating the two valves for one valve to induct pressure into the power cylinder and the other valve at the same time to educt pressure from the power cylinder, means for supplying pressure to the pressure tube, a piston in the power cylinder operating between the points for inducting and educting pressure from the power cylinder, a reciprocating piston stem for the piston, and a bottle support connected with the piston stem for both raising the bottle into filling position and lowering the bottle for removal after filling, substantially as described.

6. In a machine for bottling liquids, the combination of a rotatable table, a power cylinder suspended from and rotatable with the table, a pressure tube suspended from and rotatable with the table and located in correlation to the power cylinder and having communication at each end with the power cylinder, a valve at the upper end of the pressure tube controlling the induction of pressure into the power cylinder from the pressure tube and the eduction of pressure from the power cylinder, a valve at the lower end of the pressure tube controlling the induction of pressure into the power cylinder from the pressure tube and the eduction of pressure from the power cylinder, a hollow rod or stem within the pressure tube connecting the two valves and having a plurality of holes in its wall for admitting pressure from the tube into the hollow valve stem, for simultaneously operating the two valves for one valve to induct pressure into the power cylinder and the other valve at the same time to educt pressure from the power cylinder, means for supplying pressure to the pressure tube, a piston in the power cylinder operating between the points for inducting and educting pressure from the power cylinder, a reciprocating piston stem for the piston, and a bottle support connected with the piston stem for both raising the bottle into filling position and lowering the bottle for removal after filling, substantially as described.

7. In a machine for bottling liquids, the combination of a revoluble shaft having a longitudinal passage therein for transmitting pressure, a power cylinder revoluble with the shaft, a pressure tube revoluble with the shaft and located in correlation to the power cylinder, a conduit transmitting pressure between the passage of the shaft and the pressure tube, a rotatable valve at the upper end of the pressure tube controlling the induction of pressure into the power cylinder from the tube and the eduction of pressure from the cylinder, a rotatable valve at the lower end of the pressure tube controlling the induction of pressure into the power cylinder from the pressure tube and the eduction of pressure from the power cylinder, a connection between the two valves, means for simultaneously rotating the two valves for one valve to induct pressure into the power cylinder and the other valve at the same time to educt pressure from the power cylinder, a piston in the power cylinder operating between the points for inducting and educting pressure from the power cylinder, a reciprocating piston stem for the piston, and a bottle support connected with the piston stem for both raising the bottle into filling position and lowering the bottle for removal after filling, substantially as described.

8. In a machine for bottling liquids, the combination of a revoluble shaft having a longitudinal passage therein for transmitting pressure, a power cylinder revoluble with the shaft, a pressure tube revoluble with the shaft and located in correlation to the power cylinder, a conduit transmitting pressure between the passage of the shaft and the pressure tube, a valve at the upper end of the pressure tube controlling the induction of pressure into the power cylinder from the tube and the eduction of pressure from the cylinder, a valve at the lower end of the pressure tube controlling the induction of pressure into the power cylinder from the pressure tube and the eduction of pressure from the power cylinder, a hollow valve rod within the pressure tube connecting the two valves and having a plurality of holes in its wall for admitting pressure from the tube into the hollow valve rod, for simultaneously operating the two valves for one valve to induct pressure into the power cylinder and the other valve at the same time to educt pressure from the power cylinder, a piston in the power cylinder operating between the points for inducting and educting pressure from the power cylinder, a reciprocating piston stem for the piston, and a bottle support connected with the piston stem for both raising the bottle into filling position and lowering the bottle for removal after filling, substantially as described.

9. In a machine for bottling liquids, the combination of a rotatable filling tank for containing liquid, a fixed filling tube carried by and rotatable with the filling tank, a receptacle for syrup carried by and rotatable with the filling tank and having communication with the fixed filling tube, a piston operating in the syrup receptacle, means for supplying pressure under the piston and discharging syrup from the receptacle into the filling tube, a piston stem depending from the piston, an adjustable tube encircling the piston stem, and a coil spring within the adjustable tube and encircling the piston stem for returning the piston to normal position after each discharge of syrup from the receptacle, substantially as described.

10. In a machine for bottling liquids, the combination of a revoluble hollow shaft having therein a passage for transmitting pressure, a filling tank for liquid rotatable from the revoluble hollow shaft, a fixed filling tube for liquid carried by the tank, a syrup receptacle carried by the tank and having communication with the fixed filling tube, a piston in the syrup receptacle, a tube between the revoluble shaft and the syrup receptacle for admitting pressure to the receptacle below the piston and raising the piston to discharge syrup from the receptacle into the filling tube, a piston stem depending from the piston, an adjustable tube encircling the piston stem, and a coil spring within the adjustable tube and encircling the piston stem for returning the piston to normal position after each discharge of the syrup, substantially as described.

11. In a machine for bottling liquids, the combination of a revoluble hollow shaft having therein a passage for transmitting pressure, a filling tank for liquid rotatable from the revoluble hollow shaft, a fixed filling tube for liquid carried by the tank, a syrup receptacle carried by the tank and having communication with the fixed filling tube, a piston in the syrup receptacle, a tube between the revoluble shaft and the syrup receptacle for admitting pressure to the receptacle below the piston and raising the piston to discharge syrup from the receptacle into the filling tube, means for returning the piston to normal position after each discharge of the syrup, a reservoir for syrup on the top of the filling tank, a tube between the syrup reservoir and the syrup receptacle and attached to the upper end of the syrup receptacle for supplying the syrup receptacle with syrup, substantially as described.

12. In a machine for bottling liquids, the combination of a revoluble hollow shaft having therein a passage for transmitting pressure, a filling tank for liquid rotatable from the revoluble hollow shaft, a fixed filling tube for liquid carried by the tank, a syrup receptacle carried by the tank and having communication with the fixed filling tube, a piston in the syrup receptacle, a tube between the revoluble shaft and the syrup receptacle for admitting pressure to the receptacle below the piston and raising the piston to discharge syrup from the receptacle into the filling tube, means for returning the piston to normal position after each discharge of the syrup, a reservoir for syrup on the top of the filling tank, a tube between the syrup reservoir and the syrup receptacle for supplying the syrup receptacle with syrup, a valve controlling the flow of syrup from the reservoir into the receptacle, and a valve controlling the discharge of syrup from the receptacle into the filling tube, substantially as described.

13. In a machine for bottling liquids, the combination of a revoluble hollow shaft having therein a passage for transmitting pressure, a filling tank for liquid rotatable from the revolving hollow shaft, a fixed filling tube for liquid carried by the tank, a syrup receptacle carried by the tank and having communication with the fixed filling tube, a piston in the syrup receptacle, a tube between the revoluble shaft and the syrup receptacle for admitting pressure to the receptacle below the piston and raising the piston to discharge syrup from the receptacle into the filling tube, means for returning the piston to normal position after each discharge of the syrup, an endwise slidable sealing head encircling the filling tube, a valve in the pipe between the revoluble hollow shaft and the syrup receptacle, and a connection between the valve and the sealing head for operating the valve with the endwise movements of the sealing head, substantially as described.

14. In a machine for bottling liquids, the combination of a revoluble hollow shaft having therein a passage for transmitting pressure, a filling tank for liquid rotatable from the revolving hollow shaft, a fixed filling tube for liquid carried by the tank, a syrup receptacle carried by the tank and having communication with the fixed filling tube, a piston in the syrup receptacle, a tube between the revoluble shaft and the syrup receptacle for admitting pressure to the receptacle below the piston and raising the piston to discharge syrup from the receptacle into the filling tube, means for returning the piston to normal position after each discharge of the syrup, an endwise slidable sealing head encircling the filling tube, a valve in the pipe between the revoluble hollow shaft and the syrup receptacle, and a divided rod connecting the endwise movable sealing head and the valve of the tube for opening and closing the valve with the endwise movements of the sealing head, substantially as described.

15. In a machine for bottling liquids, the combination of a revoluble hollow shaft having therein a passage for transmitting pressure, a filling tank for liquid rotatable from the revoluble shaft, and a tube in communication with the longitudinal pressure passage of the shaft and leading into and terminating above the liquid in the filling tank, for supplying pressure to the filling tank above the liquid therein, substantially as described.

16. In a machine for bottling liquids, the combination of a revoluble hollow shaft having therein a passage for transmitting pressure unrestricted throughout its length, a filling tank for liquid rotatable from the revoluble shaft, a tube extending out from the shaft in communication with the longitudinal pressure passage of the shaft and leading into and terminating above the liquid in the filling tank, for supplying pressure to the filling tank above the liquid therein, and a pressure regulator on the tube for controlling the pressure in the tank, substantially as described.

17. In a machine for bottling liquid, the combination of a rotatable filling tank, a fixed filling tube carried by the rotatable tank, a siphon tube in communication with the filling tube and located within the filling tank, a check valve between the filling tube and the siphon tube, a syrup receptacle carried by the tank and having communication with the fixed filling tube, and means for discharging a charge of syrup from the syrup receptacle into the fixed filling tube, for supplying a to-be filled bottle with a flavoring syrup, substantially as described.

18. In a machine for bottling liquid, the combination of a rotatable filling tank, a fixed filling tube carried by the rotatable tank, a siphon tube in communication with the filling tube and located within the filling tank, a check valve between the filling tube and the siphon tube, a syrup receptacle carried by the tank and having communication with the fixed filling tube, a piston operating in the syrup receptacle, means for supplying pressure under the piston and discharge syrup from the receptacle into the filling tube, and means for returning the piston to normal position after each discharging operation, for supplying a to-be filled bottle with a flavoring syrup, substantially as described.

19. In a machine for bottling liquids, the combination of a piston, a bottle support having in its side wall a longitudinal opening, and an arm having a fixed relation and passed by the longitudinal opening of the bottle support, when in normal position, for the arm to engage a bottle and remove the bottle from the support as the table rotates, substantially as described.

20. In a machine for bottling liquids, the combination of a piston, a bottle support on the upper end of the piston stem and having in its side wall a longitudinal opening, an arm having a fixed relation and formed of two sections the inner section pivoted to the outer section, and a spring engaging the inner section and holding the inner section normally in fixed position and passed by the longitudinal opening of the bottle support, when in normal position, for the arm to engage a bottle and remove the bottle from the support as the table rotates, substantially as described.

21. In a machine for bottling liquids, the combination of a rotatable table, a hollow vertical shaft revoluble with the rotatable table and having therein a longitudinal passage for pressure, a plurality of upper heads depending from and carried by the rotatable table, a plurality of lower heads coinciding with the upper heads, a power cylinder between each upper and lower head, a pressure tube between each upper and lower head, a rotatable valve in each upper head, a rotatable valve in each lower head, each valve controlling the admission of pressure into the power cylinder from the pressure tube and the eduction of pressure from each power cylinder at each end thereof, a conduit for supplying pressure from the longitudinal passage of the shaft to each pressure tube, a connection between each upper and lower valve, means for simultaneously rotating each upper and lower valve, a piston in each power cylinder actuated in both directions by pressure admitted to the opposite sides of the piston, a reciprocating piston stem for each piston, and a bottle support connected with each piston stem, for both raising the bottle into filling position and lowering the bottle for removal after filling, substantially as described.

22. In a machine for bottling liquids, the combination of a revoluble shaft having therein a longitudinal passage for transmitting pressure, a filling tank rotatable from the revoluble hollow vertical shaft, a plurality of filling tubes carried by the filling tank, a plurality of syrup receptacles carried by the rotatable filling tank, one syrup receptacle for each filling tube and in communication with its filling tube, means disconnected from the filling tube and actuated by the movements of the filling tube for discharging a charge of syrup from each syrup receptacle into its filling tube, and means for supplying the syrup receptacle with syrup, substantially as described.

23. In a machine for bottling liquids, the combination of a hollow vertical revoluble shaft having therein a longitudinal passage for pressure, a filling tank rotatable from the revoluble hollow vertical shaft, a plurality of filling tubes carried by the filling tank, a plurality of syrup receptacles carried by the filling tank, one syrup receptacle for each filling tube and in communication with its filling tube, a piston in each syrup receptacle for discharging syrup from the receptacle into the filling tube, a conduit leading from the longitudinal passage for pressure in the revoluble shaft and discharging pressure into the syrup receptacle below the piston, for the upward movement of the piston to discharge syrup from the syrup receptacle into its filling tube, a piston stem depending from the piston, an adjustable tube surrounding the piston stem, and a coil spring within the adjustable tube and encircling the piston stem, for returning the piston to normal position after each discharge of the syrup, substantially as described.

24. In a machine for bottling liquids, the combination of a hollow vertical revoluble shaft having therein a longitudinal passage for pressure, a filling tank rotatable from the revoluble hollow vertical shaft, a plurality of filling tubes carried by the filling tank, a sealing head for each filling tube endwise movable on the tube, a plurality of syrup receptacles carried by the filling tank, one syrup receptacle for each filling tube and in communication with its filling tube, a piston in each syrup receptacle for discharging syrup from the receptacle into the filling tube, a conduit leading from the longitudinal passage for pressure in the revoluble shaft and discharging pressure into the syrup receptacle below the piston, for the upward movement of the piston to discharge syrup from the syrup receptacle into its filling tube, means for returning the piston after each discharge of the syrup to its normal position, a valve in each conduit between the revoluble shaft and the syrup receptacle, and a connection between the valve and the endwise slidable sealing head, for operating the valve with the movements of the endwise slidable sealing head, substantially as described.

25. In a machine for bottling liquids, the combination of a filling tank for containing liquid, a filling tube mounted on the tank, a syrup receptacle mounted on the tank and having communication with the filling tube, means for discharging syrup from the syrup receptacle into the filling tube, a syrup supply tank, a tube extending from the syrup supply tank and entered into the upper end of the syrup receptacle, and means for supplying syrup to the syrup receptacle, substantially as described.

26. In a machine for bottling liquids, the combination of a filling tank for containing liquid, a filling tube mounted on the tank, a syrup receptacle mounted on the tank and in communication with the filling tube, a piston operative in the syrup receptacle for discharging syrup therefrom into the filling tube, a piston stem depending from the piston, an adjustable tube surrounding the piston stem, and a coil spring within the adjustable tube and encircling the piston stem for returning the piston to normal position after each discharge of syrup, substantially as described.

27. In a machine for bottling liquids, the combination of a revoluble shaft having therein a longitudinal passage for liquid, a plurality of power cylinders rotatable with the shaft, a bottle support for each power cylinder, a tank rotatable with the revoluble shaft and in unison with the power cylinders, a plurality of filling tubes carried by the tank, a tube slidably mounted upon the filling tube and carrying a sealing head, one filling tube for each bottle support, a plurality of syrup receptacles carried by the rotatable tank, one syrup receptacle for each filling tube and in communication with its filling tube, and means for supplying pressure from the longitudinal passage of the revoluble shaft to each power cylinder, the filling tank and each syrup receptacle, and a valve controlling communication between the longitudinal passage and the syrup receptacle, and operated by the up and down movements of the sealing head, substantially as described.

ADOLPH SCHNEIDER.

Witnesses:
  OSCAR W. BOND,
  WALKER BANNING.